US012637216B2

(12) United States Patent
Qie

(10) Patent No.: US 12,637,216 B2
(45) Date of Patent: May 26, 2026

(54) METHOD AND APPARATUS FOR CONTROLLING UNMANNED AERIAL VEHICLE

(71) Applicant: Beijing Jingdong Qianshi Technology Co., Ltd., Beijing (CN)

(72) Inventor: Xinyue Qie, Beijing (CN)

(73) Assignee: Beijing Jingdong Qianshi Technology Co., Ltd., Beijing (CN)

( * ) Notice: Subject to any disclaimer, the term of this patent is extended or adjusted under 35 U.S.C. 154(b) by 274 days.

(21) Appl. No.: 18/249,898

(22) PCT Filed: Oct. 12, 2021

(86) PCT No.: PCT/CN2021/123279
§ 371 (c)(1),
(2) Date: Apr. 20, 2023

(87) PCT Pub. No.: WO2022/095667
PCT Pub. Date: May 12, 2022

(65) Prior Publication Data
US 2023/0382568 A1      Nov. 30, 2023

(30) Foreign Application Priority Data

Nov. 4, 2020     (CN) .......................... 202011219695.4

(51) Int. Cl.
*B64D 9/00*          (2006.01)
*B60P 1/02*          (2006.01)
(Continued)

(52) U.S. Cl.
CPC ................. *B64D 9/00* (2013.01); *B60P 1/02*
(2013.01); *B60P 1/64* (2013.01); *B64D 1/22*
(2013.01);
(Continued)

(58) Field of Classification Search
CPC .......... B64D 9/00; B64D 1/22; B64D 27/357;
B64D 1/00; B60P 1/02; B60P 1/64;
(Continued)

(56) References Cited

U.S. PATENT DOCUMENTS 9,139,310 B1 *   9/2015  Wang ...................... B60L 58/12
2010/0292871 A1 *  11/2010  Schultz ................. G01S 13/867
342/29

(Continued)

FOREIGN PATENT DOCUMENTS

CN          206217861         6/2017
CN          108459618         8/2018
(Continued)

OTHER PUBLICATIONS

International Search Report and Written Opinion, issued in the corresponding PCT Application No. PCT/CN2021/123279, dated Jan. 6, 2022, 13 pages.
(Continued)

*Primary Examiner* — Fadey S. Jabr
*Assistant Examiner* — Paula L Schneider
(74) *Attorney, Agent, or Firm* — HSML P.C.

(57)          ABSTRACT

The method includes: controlling unmanned aerial vehicle to be aligned with ground orbit in destination site and continue to fly at predetermined flight altitude, in response to the unmanned aerial vehicle flying to first preset airspace near the destination site; controlling the unmanned aerial vehicle to be separated from first cabin carried by the unmanned aerial vehicle and place the separated first cabin at first position of lifting platform of shuttle vehicle driving along the ground orbit and controlling the unmanned aerial vehicle to be combined with second cabin carried at second position of the lifting platform, in response to the unmanned aerial vehicle flying to position directly above the first position and
(Continued)

being in relatively static state with the shuttle vehicle; and controlling the unmanned aerial vehicle to fly to next destination site, in response to completion of the combination of the unmanned aerial vehicle and the second cabin.

16 Claims, 9 Drawing Sheets

(51) Int. Cl.

| | |
|---|---|
| *B60P 1/64* | (2006.01) |
| *B64D 1/22* | (2006.01) |
| *B64D 27/357* | (2024.01) |
| *B64F 1/31* | (2006.01) |
| *B64U 10/13* | (2023.01) |
| *B64U 50/30* | (2023.01) |
| *B64U 101/61* | (2023.01) |
| *B65G 67/00* | (2006.01) |
| *G05D 1/692* | (2024.01) |

(52) U.S. Cl.
CPC ............... *B64F 1/31* (2013.01); *B64U 50/30* (2023.01); *B65G 67/00* (2013.01); *G05D 1/692* (2024.01); *B64D 27/357* (2024.01); *B64U 10/13* (2023.01); *B64U 2101/61* (2023.01); *B65G 2814/0313* (2013.01); *B65G 2814/0398* (2013.01)

(58) Field of Classification Search
CPC ...... B60P 3/00; B64F 1/31; B64F 1/30; B64F 1/32; B64U 50/30; B64U 10/13; B64U 2101/62; B64U 70/90; B64U 101/64; B64U 10/10; B64U 2101/00; B65G 67/00; B65G 2814/0313; B65G 2814/0398; G05D 1/692; B64C 39/024

USPC .............................................................. 701/3
See application file for complete search history.

(56) References Cited

U.S. PATENT DOCUMENTS

| | | | | |
|---|---|---|---|---|
| 2016/0073048 | A1 | 3/2016 | Howe | |
| 2017/0121023 | A1 | 5/2017 | High et al. | |
| 2019/0043370 | A1* | 2/2019 | Mulhall | ................... G08G 5/26 |
| 2019/0047342 | A1 | 2/2019 | Dietrich | |
| 2019/0161190 | A1 | 5/2019 | Gil et al. | |
| 2020/0027225 | A1* | 1/2020 | Huang | ...................... G06T 7/73 |
| 2020/0207485 | A1* | 7/2020 | Foggia | ...................... B64F 1/22 |
| 2020/0307792 | A1* | 10/2020 | Thrun | ..................... B64U 70/97 |
| 2020/0361324 | A1* | 11/2020 | Evans | ....................... B61B 1/00 |

FOREIGN PATENT DOCUMENTS

| | | | | |
|---|---|---|---|---|
| CN | 109018424 | | 12/2018 | |
| CN | 109229390 | | 1/2019 | |
| CN | 110053538 | | 7/2019 | |
| CN | 110065637 | | 7/2019 | |
| CN | 110687928 | | 1/2020 | |
| CN | 112319804 | | 2/2021 | |
| DE | 102018106058 | A1 * | 9/2019 | ........... B64C 39/024 |
| FR | 3080838 | | 11/2019 | |
| FR | 3080838 | A1 * | 11/2019 | ............. B64F 1/007 |
| JP | 2020-152211 | | 9/2020 | |
| KR | 102502726 | * | 2/2023 | ............. B60L 53/12 |

OTHER PUBLICATIONS

First Chinese Office Action issued in the corresponding Chinese patent application No. 202011219695.4., dated Oct. 29, 2021.
Extended European Search Report (EESR) issued in the corresponding European Patent Application No. 21888364.3, dated May 31, 2024, 5 pages.

* cited by examiner

100
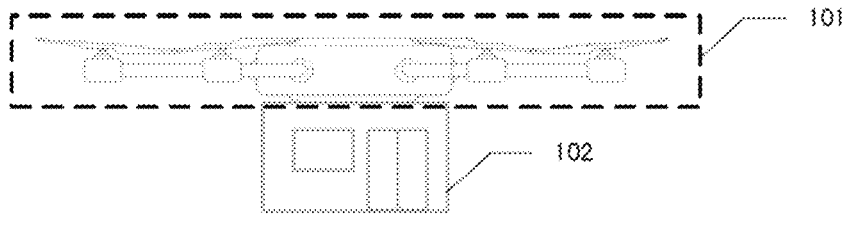
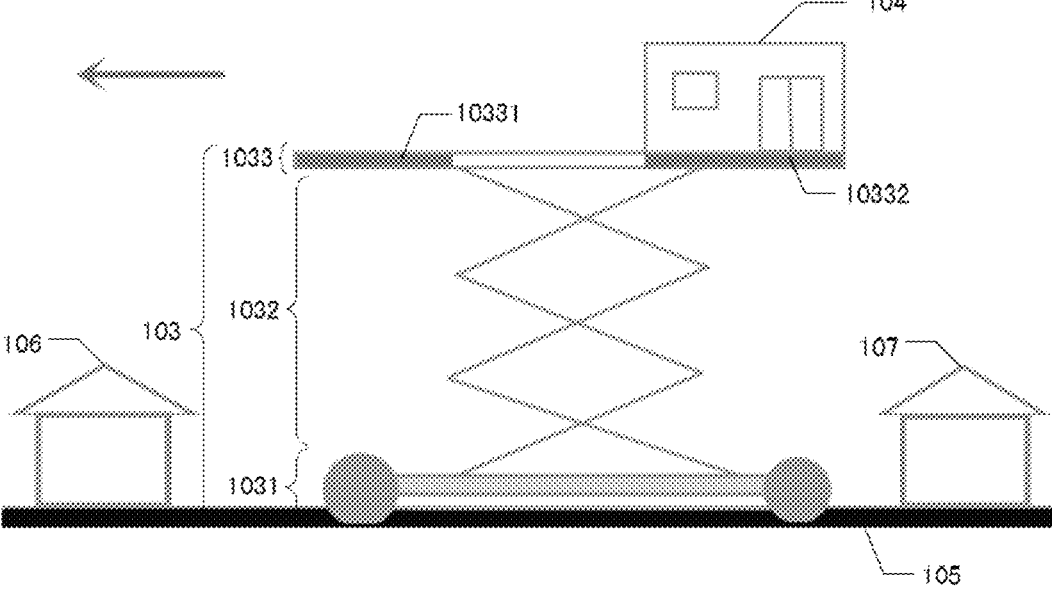
FIG. 1

200
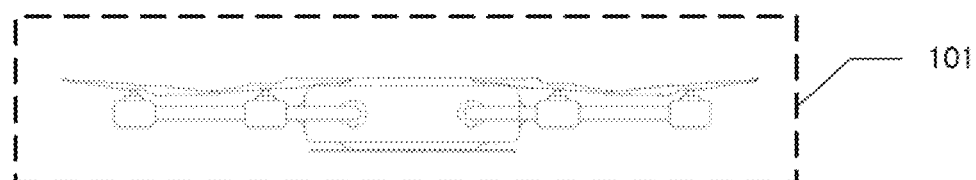
101
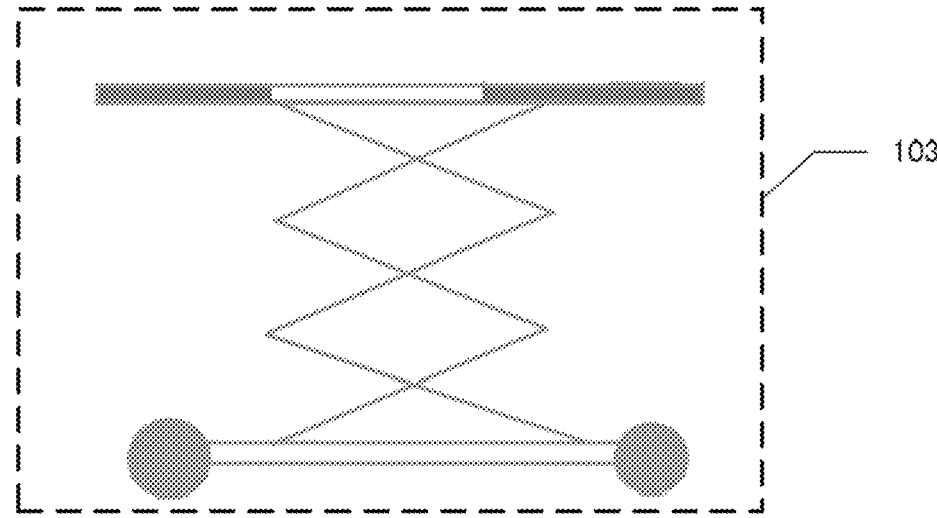
103
FIG. 2

101

1011

1012

103

10331

10332

1033

1032

1031

103

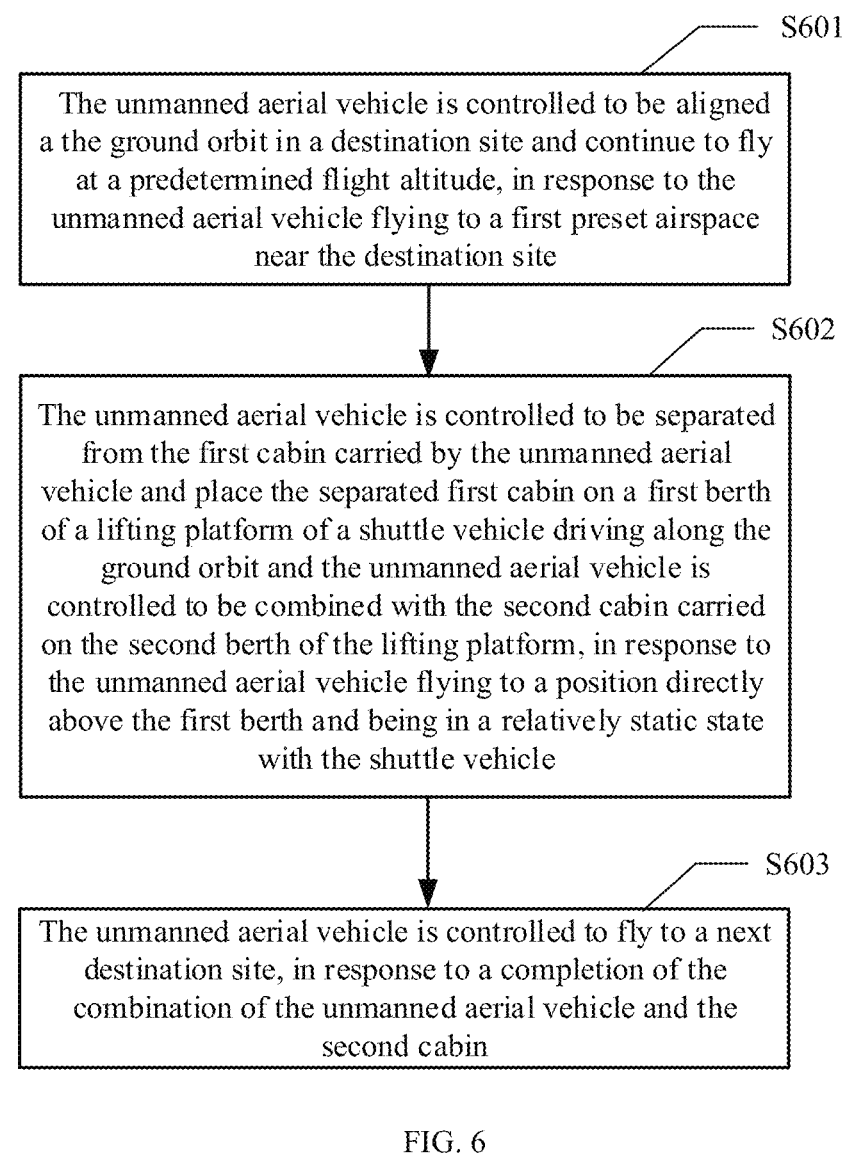

```
                                                          ⌐──── S601
   ┌──────────────────────────────────────────────────┐
   │    The unmanned aerial vehicle is controlled to be aligned │
   │  a the ground orbit in a destination site and continue to fly │
   │     at a predetermined flight altitude, in response to the │
   │   unmanned aerial vehicle flying to a first preset airspace │
   │                 near the destination site               │
   └──────────────────────────────────────────────────┘
                              │
                              │                           ⌐──── S602
                              ▼
   ┌──────────────────────────────────────────────────┐
   │  The unmanned aerial vehicle is controlled to be separated │
   │      from the first cabin carried by the unmanned aerial │
   │  vehicle and place the separated first cabin on a first berth │
   │  of a lifting platform of a shuttle vehicle driving along the │
   │          ground orbit and the unmanned aerial vehicle is │
   │   controlled to be combined with the second cabin carried │
   │  on the second berth of the lifting platform, in response to │
   │    the unmanned aerial vehicle flying to a position directly │
   │    above the first berth and being in a relatively static state │
   │                    with the shuttle vehicle            │
   └──────────────────────────────────────────────────┘
                              │
                              │                           ⌐──── S603
                              ▼
   ┌──────────────────────────────────────────────────┐
   │  The unmanned aerial vehicle is controlled to fly to a next │
   │      destination site, in response to a completion of the │
   │    combination of the unmanned aerial vehicle and the │
   │                        second cabin                    │
   └──────────────────────────────────────────────────┘
```

FIG. 6

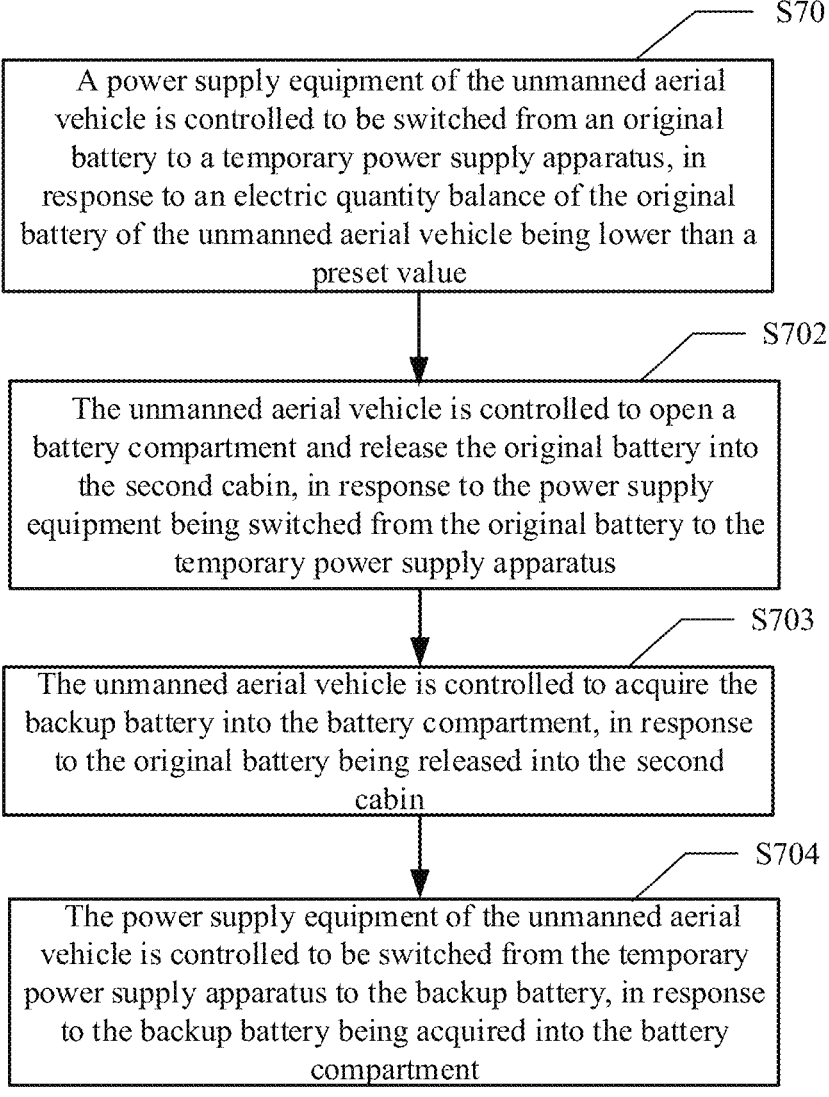

S701

A power supply equipment of the unmanned aerial vehicle is controlled to be switched from an original battery to a temporary power supply apparatus, in response to an electric quantity balance of the original battery of the unmanned aerial vehicle being lower than a preset value

S702

The unmanned aerial vehicle is controlled to open a battery compartment and release the original battery into the second cabin, in response to the power supply equipment being switched from the original battery to the temporary power supply apparatus

S703

The unmanned aerial vehicle is controlled to acquire the backup battery into the battery compartment, in response to the original battery being released into the second cabin

S704

The power supply equipment of the unmanned aerial vehicle is controlled to be switched from the temporary power supply apparatus to the backup battery, in response to the backup battery being acquired into the battery compartment

FIG. 7

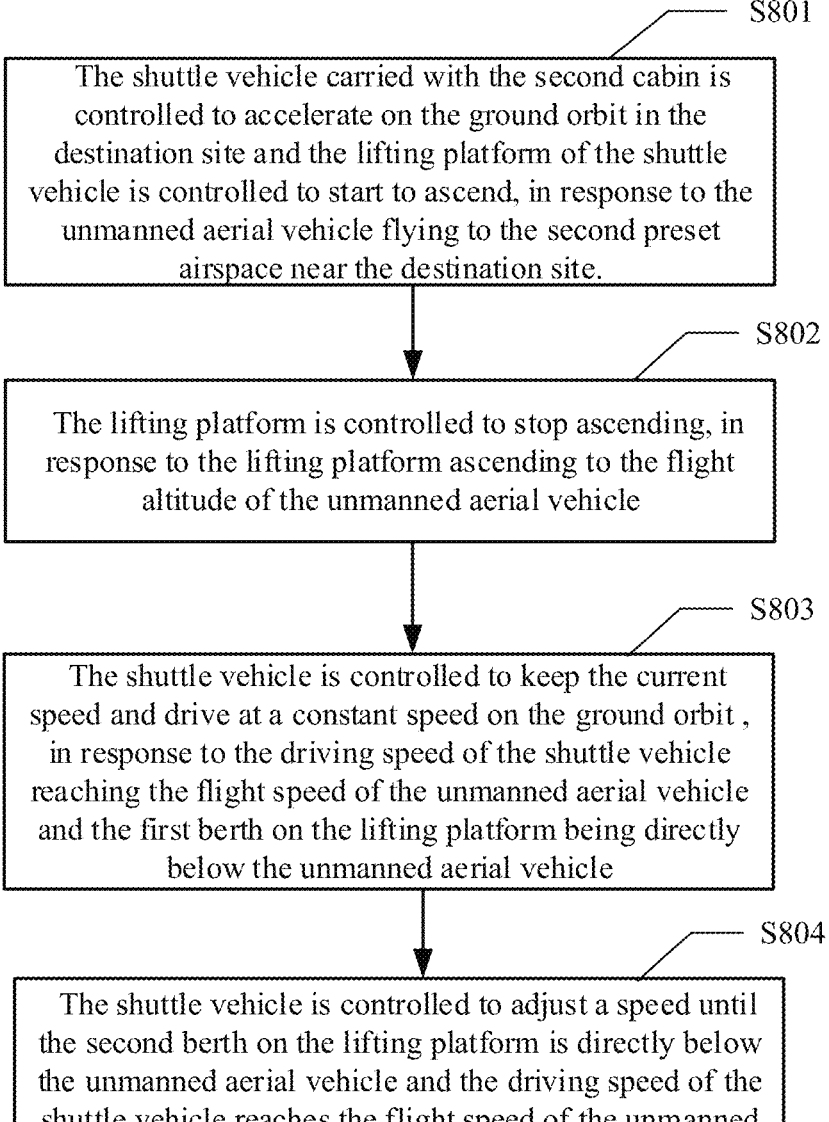

S801

The shuttle vehicle carried with the second cabin is controlled to accelerate on the ground orbit in the destination site and the lifting platform of the shuttle vehicle is controlled to start to ascend, in response to the unmanned aerial vehicle flying to the second preset airspace near the destination site.

S802

The lifting platform is controlled to stop ascending, in response to the lifting platform ascending to the flight altitude of the unmanned aerial vehicle

S803

The shuttle vehicle is controlled to keep the current speed and drive at a constant speed on the ground orbit, in response to the driving speed of the shuttle vehicle reaching the flight speed of the unmanned aerial vehicle and the first berth on the lifting platform being directly below the unmanned aerial vehicle

S804

The shuttle vehicle is controlled to adjust a speed until the second berth on the lifting platform is directly below the unmanned aerial vehicle and the driving speed of the shuttle vehicle reaches the flight speed of the unmanned aerial vehicle again, in response to the first cabin being placed on the first berth

METHOD AND APPARATUS FOR CONTROLLING UNMANNED AERIAL VEHICLE

CROSS REFERENCE TO RELATED APPLICATION

This application is a Section 371 National Stage Application of International Application No. PCT/CN2021/123279, filed on Oct. 12, 2021, entitled "METHOD AND APPARATUS FOR CONTROLLING UNMANNED AERIAL VEHICLE", which is incorporated herein by reference in its entirety which claims priority to Chinese Application No. 202011219695.4, filed on Nov. 4, 2020, incorporated herein by reference in their entirety.

TECHNICAL FIELD

The present disclosure relates to fields of unmanned aerial vehicle and shuttle vehicle technologies, etc., and specifically to a method and an apparatus for controlling an unmanned aerial vehicle, a method and an apparatus for controlling a shuttle vehicle, an unmanned aerial vehicle, a shuttle vehicle, a transportation system, and an electronic device and a computer-readable storage medium.

BACKGROUND

In the related art, unmanned aerial vehicle passenger carrying is that an unmanned aerial vehicle carries a passenger to take off from one site and then fly to another site to land, so as to transport the passenger from one site to another site. Then the unmanned aerial vehicle carries a passenger to take off from another site and fly to other sites to land, so as to transport passengers from another site to other sites. In the process, the unmanned aerial vehicle requires to undergo the processes of taking off, accelerating, constant speed, decelerating and landing, and then taking off, accelerating, constant speed, decelerating and landing. Therefore, a large amount of energy and time may be consumed, resulting in a low efficiency.

SUMMARY

In view of the above, the present disclosure provides a method and an apparatus for controlling an unmanned aerial vehicle, a method and an apparatus for controlling a shuttle vehicle, an unmanned aerial vehicle, a shuttle vehicle, a transportation system, and an electronic device and a computer-readable storage medium.

An aspect of embodiments of the present disclosure provides a method for controlling an unmanned aerial vehicle, including: controlling the unmanned aerial vehicle to be aligned with a ground orbit in a destination site and continue to fly at a predetermined flight altitude, in response to the unmanned aerial vehicle flying to a first preset airspace near the destination site; controlling the unmanned aerial vehicle to be separated from a first cabin carried by the unmanned aerial vehicle and place the separated first cabin at a first position of a lifting platform of a shuttle vehicle driving along the ground orbit and controlling the unmanned aerial vehicle to be combined with a second cabin carried at a second position of the lifting platform, in response to the unmanned aerial vehicle flying to a position directly above the first position and being in a relatively static state with the shuttle vehicle; and controlling the unmanned aerial vehicle to fly to a next destination site, in response to a completion of the combination of the unmanned aerial vehicle and the second cabin.

According to embodiments of the present disclosure, the controlling the unmanned aerial vehicle to be aligned with a ground orbit in a destination site and continue to fly at a predetermined flight altitude includes: controlling the unmanned aerial vehicle to be aligned with the ground orbit and maintain an original flight altitude to continue to fly at a constant speed at an original flight speed.

According to embodiments of the present disclosure, the controlling the unmanned aerial vehicle to be combined with a second cabin carried at a second position of a lifting platform includes: controlling the unmanned aerial vehicle to adjust a speed until the unmanned aerial vehicle is directly above the second position and a flight speed of the unmanned aerial vehicle is consistent with a driving speed of the shuttle vehicle again, so that the unmanned aerial vehicle and the shuttle vehicle are kept in a relatively static state again; and controlling the unmanned aerial vehicle to be combined with the second cabin, in response to the unmanned aerial vehicle and the shuttle vehicle being kept in a relatively static state again.

According to embodiments of the present disclosure, the method further includes providing the unmanned aerial vehicle with energy supply through a backup battery carried in the second cabin.

According to embodiments of the present disclosure, the providing the unmanned aerial vehicle with energy supply through a backup battery carried in the second cabin includes: controlling a power supply equipment of the unmanned aerial vehicle to be switched from an original battery to a temporary power supply apparatus, in response to an electric quantity balance of the original battery of the unmanned aerial vehicle being lower than a preset value; controlling the unmanned aerial vehicle to open a battery compartment and release the original battery into the second cabin, in response to the power supply equipment being switched from the original battery to the temporary power supply apparatus; controlling the unmanned aerial vehicle to acquire the backup battery into the battery compartment, in response to the original battery being released into the second cabin; and controlling the power supply equipment of the unmanned aerial vehicle to be switched from the temporary power supply apparatus to the backup battery, in response to the backup battery being acquired into the battery compartment.

Another aspect of the present disclosure provides a method for controlling a shuttle vehicle, including: controlling the shuttle vehicle carried with a second cabin to accelerate on a ground orbit in a destination site and controlling a lifting platform of the shuttle vehicle to start to ascend, in response to an unmanned aerial vehicle flying to a second preset airspace near the destination site, wherein the unmanned aerial vehicle is carried with a first cabin being separable from a fuselage, and the unmanned aerial vehicle above the destination site is aligned with the ground orbit and flies at a predetermined flight altitude, and the second cabin is placed at a second position on the lifting platform; controlling the lifting platform to stop ascending, in response to the lifting platform ascending to a flight altitude of the unmanned aerial vehicle; controlling the shuttle vehicle to keep a current speed to drive at a constant speed on the ground orbit, in response to a driving speed of the shuttle vehicle reaching a flight speed of the unmanned aerial vehicle and a first position on the lifting platform being directly below the unmanned aerial vehicle, so as to keep the shuttle vehicle and the unmanned aerial vehicle in a relatively static state, and enable the unmanned aerial vehicle to place the separated first cabin on the first position; and controlling the shuttle vehicle to adjust a speed until the second position on the lifting platform is located directly below the unmanned aerial vehicle and the driving speed of the shuttle vehicle reaches the flight speed of the unmanned aerial vehicle again, in response to the first cabin being placed on the first position, so as to keep the shuttle vehicle and the unmanned aerial vehicle in a relatively static state again, and enable the unmanned aerial vehicle to be combined with the second cabin and send the second cabin to a next destination site.

According to embodiments of the present disclosure, the ground orbit is a straight ground orbit.

According to embodiments of the present disclosure, the method further includes: controlling the shuttle vehicle to decelerate on the ground orbit and controlling the lifting platform to start to descend, in response to the second cabin being separated from the lifting platform, so as to transport a passenger and/or a cargo in the first cabin to an exit of the destination site.

According to embodiments of the present disclosure, the method further includes: fixing the first cabin by a safety apparatus arranged at the first position, in response to the first cabin being placed on the first position.

According to embodiments of the present disclosure, the method further includes: releasing a fixing effect of a safety apparatus arranged at the second position on the second cabin, in response to the shuttle vehicle and the unmanned aerial vehicle being in a relatively static state again.

Another aspect of the present disclosure provides an apparatus for controlling an unmanned aerial vehicle, including: a first flight control module configured to control the unmanned aerial vehicle to be aligned with a ground orbit in a destination site and continue to fly at a predetermined flight altitude, in response to the unmanned aerial vehicle flying to a first preset airspace near the destination site; a cabin control module configured to control the unmanned aerial vehicle to be separated from a first cabin carried by the unmanned aerial vehicle and place the separated first cabin at a first position of a lifting platform of a shuttle vehicle driving along the ground orbit and control the unmanned aerial vehicle to be combined with a second cabin carried at a second position of the lifting platform, in response to the unmanned aerial vehicle flying to a position directly above the first position and being in a relatively static state with the shuttle vehicle; and a second flight control module configured to control the unmanned aerial vehicle to fly to a next destination site, in response to a completion of the combination of the unmanned aerial vehicle and the second cabin.

Another aspect of the present disclosure provides an apparatus for controlling a shuttle vehicle, including: a first control module configured to control the shuttle vehicle carried with a second cabin to accelerate on a ground orbit in a destination site and controlling a lifting platform of the shuttle vehicle to start to ascend, in response to an unmanned aerial vehicle flying to a second preset airspace near the destination site, wherein the unmanned aerial vehicle is carried with a first cabin being separable from a fuselage, and the unmanned aerial vehicle above the destination site is aligned with the ground orbit and flies at a predetermined flight altitude, and the second cabin is placed at a second position on the lifting platform; a second control module configured to control the lifting platform to stop ascending, in response to the lifting platform ascending to a flight altitude of the unmanned aerial vehicle; a third control module configured to control the shuttle vehicle to keep a current speed to drive at a constant speed on the ground orbit, in response to a driving speed of the shuttle vehicle reaching a flight speed of the unmanned aerial vehicle and a first position on the lifting platform being directly below the unmanned aerial vehicle, so as to keep the shuttle vehicle and the unmanned aerial vehicle in a relatively static state, and enable the unmanned aerial vehicle to place the separated first cabin on the first position; and a fourth control module configured to control the shuttle vehicle to adjust a speed until the second position on the lifting platform is located directly below the unmanned aerial vehicle and the driving speed of the shuttle vehicle reaches the flight speed of the unmanned aerial vehicle again, in response to the first cabin being placed on the first position, so as to keep the shuttle vehicle and the unmanned aerial vehicle in a relatively static state again, and enable the unmanned aerial vehicle to be combined with the second cabin and send the second cabin to a next destination site.

Another aspect of the present disclosure provides an unmanned aerial vehicle, including: the apparatus for controlling an unmanned aerial vehicle according to embodiments of the present disclosure; a fuselage; and a carrying apparatus arranged at a bottom of the fuselage for carrying a separable cabin.

Another aspect of the present disclosure provides a shuttle vehicle, including: the apparatus for controlling a shuttle vehicle according to embodiments of the present disclosure; a vehicle body; a lifting apparatus arranged on a first plane of a top of the vehicle body, and configured to perform an ascending action and a descending action based on a control command of the apparatus; and a lifting platform arranged on a second plane at a top of the lifting apparatus and configured to park a separable cabin carried by the unmanned aerial vehicle, wherein lifting platform includes at least two berths.

According to embodiments of the present disclosure, the shuttle vehicle further includes: a safety apparatus arranged on the lifting platform, and configured to fix the separable cabin parked on the lifting platform.

Another aspect of the present disclosure provides a transportation system, including: at least one unmanned aerial vehicle according to embodiments of the present disclosure; and at least one shuttle vehicle according to embodiments of the present disclosure.

Another aspect of the present disclosure provides an electronic device, including: one or more processors; and a memory configured to store one or more programs, wherein the one or more programs, when executed by the one or more processors, allow the one or more processors to implement the method according to embodiments of the present disclosure.

Another aspect of the present disclosure provides a computer-readable storage medium having executable instructions stored thereon, wherein the instructions, when executed by a processor, allow the processor to implement the method according to embodiments of the present disclosure.

BRIEF DESCRIPTION OF THE DRAWINGS

The above and other objectives, features and advantages of the present disclosure will become more apparent from the following description of embodiments of the present disclosure with reference to the accompanying drawings.

FIG. 1 schematically shows an exemplary system architecture and application scenario to which a method and an apparatus for controlling an unmanned aerial vehicle and a shuttle vehicle may be applied according to embodiments of the present disclosure.

FIG. 2 schematically shows a schematic diagram of a transportation system according to embodiments of the present disclosure.

FIG. 6 schematically shows a flowchart of a method for controlling an unmanned aerial vehicle according to embodiments of the present disclosure.

FIG. 7 schematically shows a flowchart of providing energy supply for an unmanned aerial vehicle through a backup battery carried in a second cabin according to embodiments of the present disclosure.

FIG. 8 schematically shows a flowchart of a method for controlling a shuttle vehicle according to an embodiment of the present disclosure.

DETAILED DESCRIPTION OF EMBODIMENTS

Figure 3:
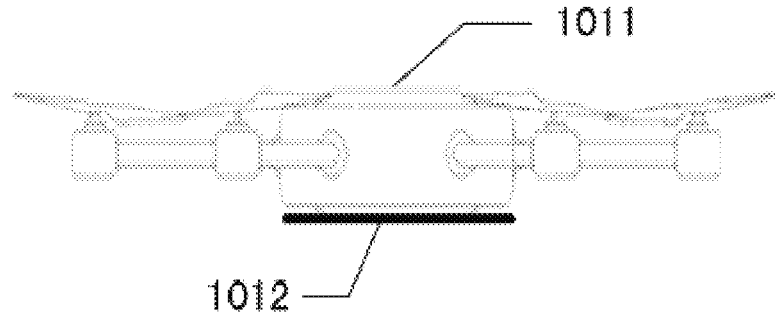
FIG. 3 schematically shows a structure diagram of an unmanned aerial vehicle according to embodiments of the present disclosure.

Embodiments of the present disclosure will be described below with reference to the accompanying drawings. It should be understood, however, that these descriptions are merely exemplary and are not intended to limit the scope of the present disclosure. In the following detailed descriptions, for purposes of explanation, numerous specific details are set forth in order to provide a thorough understanding of embodiments of the present disclosure. It is obvious, however, that one or more embodiments may be implemented without these specific details. In addition, in the following descriptions, descriptions of well-known structures and technologies are omitted to avoid unnecessarily obscuring the concept of the present disclosure.

Terms used herein are for the purpose of describing embodiments only and are not intended to limit the present disclosure. Terms "comprising", "including" and the like used herein specify a presence of the feature, step, operation and/or component, but do not preclude a presence or addition of one or more other features, steps, operations or components.

All terms (including technical and scientific terms) used herein have the meaning as commonly understood by those skilled in the art, unless otherwise defined. It should be noted that the terms used herein should be construed to have meanings consistent with the context of the present description and should not be construed in an idealized or overly rigid manner.

Where expressions like "at least one of A, B, and C, etc." are used, they should generally be interpreted in accordance with the meaning of the expression as commonly understood by those skilled in the art (e.g., "a system having at least one of A, B and C" should include, but not be limited to, a system having A alone, having B alone, having C alone, having A and B, having A and C, having B and C, and/or having A, B, C, etc.).

Embodiments of the present disclosure provide a method for controlling an unmanned aerial vehicle and an apparatus capable of applying the method. The method includes: controlling the unmanned aerial vehicle to be aligned with a ground orbit in a destination site and continue to fly at a predetermined flight altitude, in response to the unmanned aerial vehicle flying to a first preset airspace near the destination site; controlling the unmanned aerial vehicle to be separated from a first cabin carried by the unmanned aerial vehicle and place the separated first cabin at a first position of a lifting platform of a shuttle vehicle driving along the ground orbit and controlling the unmanned aerial vehicle to be combined with a second cabin carried at a second position of the lifting platform. in response to the unmanned aerial vehicle flying to a position directly above the first position and being in a relatively static state with the shuttle vehicle; and controlling the unmanned aerial vehicle to fly to a next destination site, in response to a completion of the combination of the unmanned aerial vehicle and the second cabin.

FIG. 1 schematically shows an exemplary system architecture and application scenario to which a method and an apparatus for controlling an unmanned aerial vehicle and a shuttle vehicle may be applied according to embodiments of the present disclosure. It should be noted that FIG. 1 is only an example of the system architecture and application scenario to which embodiments of the present disclosure may be applied, so as to help those skilled in the art understand the technical content of the present disclosure, but it does not mean that embodiments of the present disclosure may not be used for other apparatuses, systems, environments or scenarios.

As shown in FIG. 1, a system architecture 100 according to the embodiment may include: an unmanned aerial vehicle 101, a separable cabin 102 carried by the unmanned aerial vehicle 101, a shuttle vehicle 103, a separable cabin 104 that may be safely carried on the shuttle vehicle 103, a ground orbit 105, an entrance 106 and an exit 107 in a destination site A.

It should be noted that in embodiments of the present disclosure, the shuttle vehicle 103 includes a vehicle body 1031, a lifting apparatus 1032 and a lifting platform 1033, wherein the lifting apparatus 1032 is arranged at a top of the vehicle body 1031, and the lifting platform 1033 is arranged at a top of the lifting apparatus 1032. The lifting platform 1033 may include at least two berths, such as a passenger delivery berth 10331 and a passenger reception berth 10332.

In an application scenario of embodiments of the present disclosure, a passenger departing from the destination site A may enter the site from the entrance 106 and get on the cabin 104 parked in the passenger delivery berth of the lifting platform 1033 of the shuttle vehicle 103. When the unmanned aerial vehicle 101 which carries the cabin 102 carrying a passenger from other sites to the destination site A flies close to the destination site A and aligned with the ground orbit 105, the shuttle vehicle 103 may accelerate along the ground orbit 105 until the shuttle vehicle 103 accelerates to a speed consistent with the speed of the unmanned aerial vehicle 101, and the shuttle vehicle 103 is directly below the unmanned aerial vehicle 101, then the shuttle vehicle 103 is controlled to keep the current speed and drive at a constant speed so that the shuttle vehicle 103 and the unmanned aerial vehicle 101 may be kept in a relatively static state. During the driving process of the shuttle vehicle 103, the lifting apparatus 1032 controls the lifting platform 1033 to ascend until an altitude of the cabin 104 reaches the flight altitude of the unmanned aerial vehicle 101. When the shuttle vehicle 103 and the unmanned aerial vehicle 101 are in a relatively static state, and the altitude of the cabin 104 reaches the flight altitude of the unmanned aerial vehicle 101, the unmanned aerial vehicle 101 may first be separated from the cabin 102 and place the separated cabin 102 at the passenger reception berth on the lifting platform 1033 of the shuttle vehicle 103, and then carry the cabin 104 parked on the passenger delivery berth of the lifting platform 1033 of the shuttle vehicle 103 and directly fly to other sites. Then, the shuttle vehicle 103 decelerates and the lifting apparatus 1032 controls the lifting platform 1033 to descend, so as to transport the passenger in the cabin 102 to the exit 107. In the application scenario, since after the unmanned aerial vehicle 101 arrives at the destination site A, the unmanned aerial vehicle 101 does not require to go through the process of first landing and then taking off, or even the process of first decelerating and then accelerating, and may put down a passenger going to the site and carry a passenger going to other sites, which may save time, improve passenger carrying efficiency, and save energy consumption.

Embodiments of the present disclosure may further be applied to other scenarios, such as a scenario of unmanned aerial vehicle transporting a cargo through the above-mentioned method, and so on.

It should be understood that the number of cabins, unmanned aerial vehicles, shuttle vehicles, ground orbits, entrances and exits in FIG. 1 is only schematic. According to implementation requirements, there may be any number of cabins, unmanned aerial vehicles, shuttle vehicles, ground orbits, entrances and exits.

Embodiments of the present disclosure disclose a transportation system.

FIG. 2 schematically shows a transportation system according to embodiments of the present disclosure.

As shown in FIG. 2, in the embodiment, a transportation system 200 may include at least one unmanned aerial vehicle 101 and at least one shuttle vehicle 103.

Exemplarily, the transportation system may include two unmanned aerial vehicles (the two unmanned aerial vehicles are called a first unmanned aerial vehicle and a second unmanned aerial vehicle), and a first cabin carried on the first unmanned aerial vehicle and a second cabin carried on the second unmanned aerial vehicle. The transportation system further includes a shuttle vehicle (the shuttle vehicle is provided with a third cabin and a fourth cabin). The transportation system further includes a ground orbit.

It should be noted that in embodiments of the present disclosure, the shuttle vehicle includes a vehicle body, a lifting apparatus and a lifting platform, wherein the lifting apparatus is arranged at a top of the vehicle body, and the lifting platform is arranged at a top of the lifting apparatus. The lifting platform includes a first passenger delivery berth for placing the third cabin and a second passenger delivery berth for placing the fourth cabin, as well as a first passenger reception berth for placing the first cabin and a second passenger reception berth for placing the second cabin.

In an embodiment, two unmanned aerial vehicles enter the site sequentially. When the first unmanned aerial vehicle carried with the first cabin which goes from other sites to the destination site approaches the destination site and flies in alignment with the ground orbit, the shuttle vehicle accelerates along the ground orbit until the shuttle vehicle accelerates to a speed consistent with the flight speed of the first unmanned aerial vehicle, and the shuttle vehicle is directly below the first unmanned aerial vehicle. Then, the shuttle vehicle will keep a current speed at a constant speed, so that the shuttle vehicle and the first unmanned aerial vehicle may be kept in a relatively static state. The third cabin and the fourth cabin are transported on the shuttle vehicle. During the acceleration process of the shuttle vehicle, the lifting platform may be controlled to ascend at the same time. When the altitude of the third cabin reaches the flight altitude of the first unmanned aerial vehicle, the lifting platform stop ascending.

Then the first unmanned aerial vehicle is separated from the first cabin, and the separated first cabin is placed on the first passenger reception berth on the lifting platform of the shuttle vehicle, and then the first unmanned aerial vehicle carries the third cabin parked on the first passenger reception berth of the lifting platform of the shuttle vehicle and flies to other sites. At this point, the shuttle vehicle may maintain a constant speed and the lifting platform may maintain the original altitude.

Then the second unmanned aerial vehicle carried with the second cabin flies to a position near the site. When the second unmanned aerial vehicle flies in alignment with the ground orbit, the speed of the shuttle vehicle is adjusted until the speed of the shuttle vehicle is consistent with the flight speed of the second unmanned aerial vehicle, and the fourth cabin on the second passenger delivery berth of the shuttle vehicle is directly below the second unmanned aerial vehicle. Then, the shuttle vehicle will keep the current speed at a constant speed, so that the shuttle vehicle and the second unmanned aerial vehicle may be kept in a relatively static state. During the acceleration process of the shuttle vehicle, the lifting platform is controlled to adjust the altitude at the same time. When the altitude of the fourth cabin reaches the flight altitude of the second unmanned aerial vehicle, the lifting platform stops adjusting the altitude.

At this point, the second unmanned aerial vehicle is separated from the second cabin, and the separated second cabin is placed on the second passenger reception berth on the lifting platform of the shuttle vehicle, and then the second unmanned aerial vehicle carries the fourth cabin parked on the second passenger reception berth of the lifting platform of the shuttle vehicle and flies to other sites.

Then, the shuttle vehicle decelerates, while controls the lifting platform to descend through the lifting apparatus, so as to transport passengers in the first and second cabins to the exit.

It should be noted that the method implemented by the apparatus for controlling an unmanned aerial vehicle, the structural composition of the unmanned aerial vehicle in the transportation system, the method implemented by the apparatus for controlling a shuttle vehicle and the structural composition of the shuttle vehicle will be described in detail in the following relevant embodiments of the present disclosure, which will not be repeated here.

According to embodiments of the present disclosure, since the unmanned aerial vehicle in the transportation system may include a plurality of unmanned aerial vehicles, and the shuttle vehicle may include a plurality of shuttle vehicles, thus the plurality of unmanned aerial vehicles and the plurality of shuttle vehicles may operate simultaneously, so that the transportation of cargoes and/or passenger carrying may be carried out simultaneously, thus improving the transportation efficiency.

Embodiments of the present disclosure disclose an unmanned aerial vehicle.

FIG. 3 schematically shows an unmanned aerial vehicle according to embodiments of the present disclosure.

As shown in FIG. 3, in the embodiment, the unmanned aerial vehicle 101 may include, for example, an apparatus (not shown in FIG. 3) for controlling the unmanned aerial vehicle 101, a fuselage 1011, and a carrying apparatus 1012. The carrying apparatus 1012 is arranged at a bottom of the fuselage 1011 to carry the separable cabin.

In embodiments of the present disclosure, the above-mentioned carrying apparatus may include different types of apparatuses used to fix the cabin on the unmanned aerial vehicle, such as a mechanical claw, a magnetic claw, a guide rail, a groove, etc.

In embodiments of the present disclosure, the apparatus for controlling an unmanned aerial vehicle may control a flight direction of the unmanned aerial vehicle, as well as a flight altitude and flight speed of the unmanned aerial vehicle, especially may control the unmanned aerial vehicle to be aligned with the ground orbit. The apparatus may further control the unmanned aerial vehicle to be separated from the first cabin carried by the unmanned aerial vehicle, and may control the unmanned aerial vehicle to grasp the second cabin carried by the shuttle vehicle.

In the embodiment, when the unmanned aerial vehicle carries the first cabin and flies to the destination site, the apparatus may control the unmanned aerial vehicle to fly at the predetermined flight altitude, flight speed and flight direction. For example, in the embodiment, the apparatus may control the unmanned aerial vehicle to fly at a constant speed along the ground orbit at the original flight altitude and flight speed.

The shuttle vehicle on the ground orbit may accelerate until the driving speed is the same as the flight speed of the unmanned aerial vehicle, and the shuttle vehicle is directly below the unmanned aerial vehicle. Then the shuttle vehicle is controlled to drive at a constant speed at the current speed, so that the shuttle vehicle and the unmanned aerial vehicle may be kept in a relatively static state. During the acceleration process of the shuttle vehicle, the lifting apparatus is controlled to control the lifting platform to ascend at the same time, and when the altitude of the second cabin reaches the flight altitude of the unmanned aerial vehicle, the lifting platform stops ascending.

Then the apparatus first controls the carrying apparatus of the unmanned aerial vehicle to be separated from the first cabin carried by the unmanned aerial vehicle, and then controls the carrying apparatus of the unmanned aerial vehicle to acquire the second cabin parked on the shuttle vehicle, and controls the carrying apparatus to be combined with the second cabin.

Then the apparatus controls the unmanned aerial vehicle to fly to the next site at the predetermined flight direction, flight altitude and flight speed.

The shuttle vehicle may be controlled to decelerate and the lifting platform of the shuttle vehicle may be controlled to start to descend. When the shuttle vehicle decelerates to zero and the lifting platform drops to an initial altitude, the shuttle vehicle just stops at the exit of the destination site, and the passenger goes out of the first cabin and exits from the exit.

In addition, it should be noted that the method implemented by the above-mentioned apparatus for controlling an unmanned aerial vehicle will be described in detail in the following relevant embodiments of the present disclosure, which will not be repeated here.

According to embodiments of the present disclosure, since the apparatus for controlling an unmanned aerial vehicle may control the flight altitude and speed of the unmanned aerial vehicle, and control the separation and combination of the carrying apparatus and the cabin during the flight process of the unmanned aerial vehicle, the unmanned aerial vehicle may achieve the objectives of carrying passengers efficiently and saving energy by replacing the cabin during the flight process.

Embodiments of the present disclosure disclose a shuttle vehicle.

Figure 4:
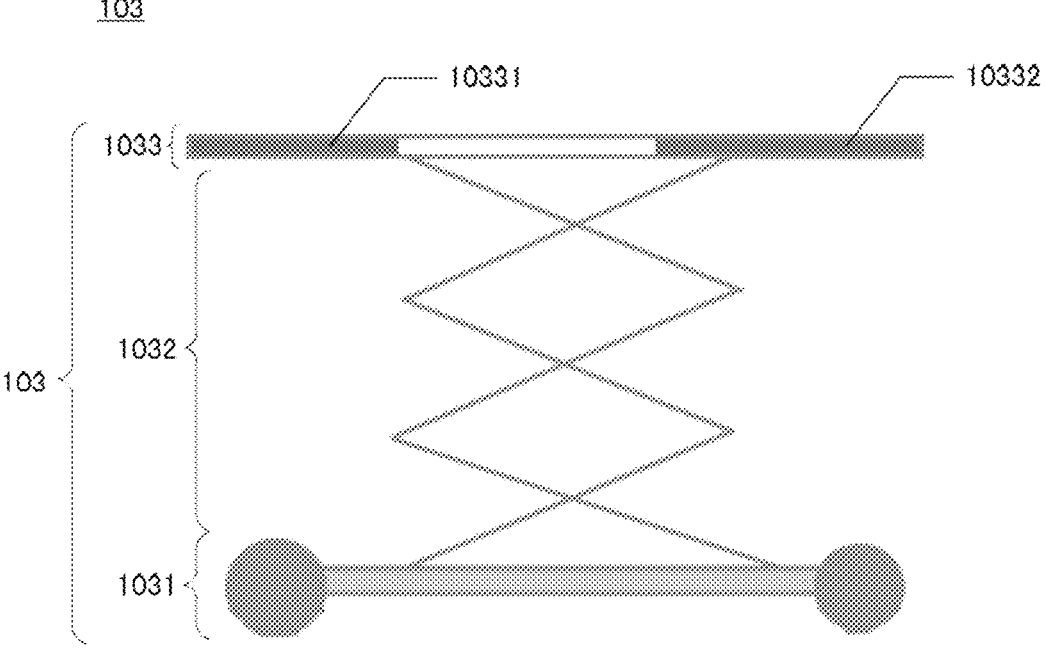
FIG. 4 schematically shows a structure diagram of a shuttle vehicle according to embodiments of the present disclosure.

FIG. 4 schematically shows a shuttle vehicle according to embodiments of the present disclosure.

As shown in FIG. 4, in the embodiment, the shuttle vehicle 103 may include, for example, an apparatus for controlling a shuttle vehicle (not shown in FIG. 4), a vehicle body 1031, a lifting apparatus 1032, and a lifting platform 1033. The lifting platform 1033 may include at least two berths, e.g., a passenger delivery berth 10331 and a passenger reception berth 10332. The lifting apparatus 1032 is arranged on a first plane at the top of the vehicle body 1031, and is used to execute the ascending action or descending action based on the control command of the apparatus. The lifting platform 1033 is arranged on a second plane at the top of the lifting apparatus 1032, and is used to park the separable cabin carried by the unmanned aerial vehicle, and the lifting platform 1033 may ascend to a certain altitude.

In embodiments of the present disclosure, the apparatus for controlling a shuttle vehicle may control the driving speed and driving direction of the shuttle vehicle, and the apparatus may further control the lifting apparatus of the shuttle vehicle to perform the ascending action or descending action.

In embodiments of the present disclosure, the lifting platform may be controlled to ascend or descend along with the lifting apparatus by controlling the lifting apparatus on the shuttle vehicle to perform the ascending and descending operations. The lifting platform of the shuttle vehicle includes at least two berths, one of the at least two berths may be used to place the cabin which is separated from the unmanned aerial vehicle, and another of the at least two berths may be used for the shuttle vehicle to carry the cabin delivered to the unmanned aerial vehicle.

According to an embodiment of the present disclosure, in response to the unmanned aerial vehicle carried with the first cabin flying a position near the destination site and being aligned with a ground orbit in the site, the apparatus of the shuttle vehicle may control the shuttle vehicle carried with the second cabin to accelerate on the ground orbit until the driving speed is consistent with the flight speed of the unmanned aerial vehicle, and the shuttle vehicle is directly below the unmanned aerial vehicle. Then the shuttle vehicle is controlled to drive at a constant speed at the current speed, so that the shuttle vehicle and the unmanned aerial vehicle may be kept in a relatively static state. During the acceleration process of the shuttle vehicle, the lifting platform may be controlled to ascend through the lifting apparatus at the same time. When the altitude of the second cabin reaches the flight altitude of the unmanned aerial vehicle, the lifting platform stops ascending.

Then, in response to the first cabin being separated from the unmanned aerial vehicle and being placed on the passenger reception berth of the lifting platform, and the second cabin parked on the lifting platform being taken away by the unmanned aerial vehicle, the apparatus for controlling a shuttle vehicle may control the shuttle vehicle to decelerate until the shuttle vehicle decelerates to zero. During the process, the lifting platform may also be controlled to descend through the lifting apparatus until the lifting platform reaches the initial altitude, so that the passenger carried in the first cabin may be transported to the exit of the site.

It should be noted that the method implemented by the above-mentioned apparatus for controlling a shuttle vehicle will be described in detail in the following relevant embodiments of the present disclosure, which will not be repeated here.

According to embodiments of the present disclosure, since the lifting platform is provided with at least two berths, one of the at least two berths may be used to place the cabin separated from the unmanned aerial vehicle, and another of the at least two berths may be used to place the cabin to be carried by the unmanned aerial vehicle. The apparatus for controlling a shuttle vehicle may control the lifting platform to ascend to the flight altitude of the unmanned aerial vehicle through the lifting apparatus, so that the unmanned aerial vehicle may place the cabin carried by the unmanned aerial vehicle on the lifting platform, and take away the cabin originally parked on the lifting platform, and thus the unmanned aerial vehicle may achieve the objectives of carrying passengers efficiently and saving energy by replacing the cabin during the flight process.

Figure 5:
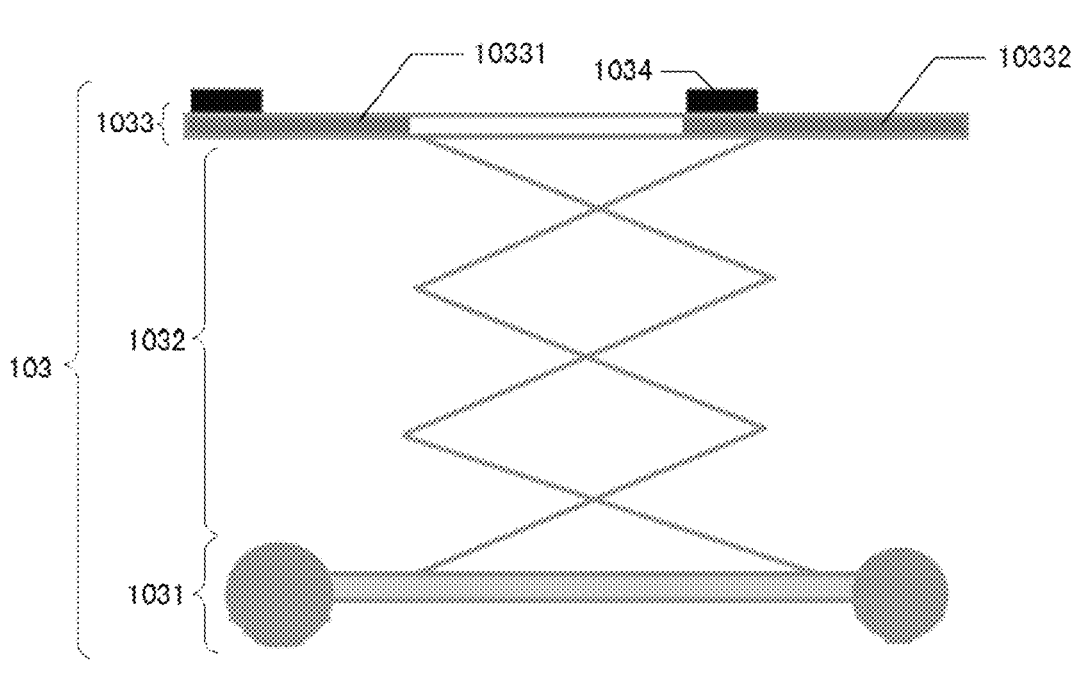
FIG. 5 schematically shows a structure diagram of another shuttle vehicle according to embodiments of the present disclosure.

Further, as an alternative embodiment, as shown in FIG. 5, the shuttle vehicle 103 may include not only the components as described in FIG. 4, but also a safety apparatus 1034.

In embodiments of the present disclosure, the safety apparatus 1034 is arranged on the lifting platform 1033 to fix the separable cabin parked on the lifting platform 1033.

The above-mentioned safety apparatus 1034 may include a guide rail, a groove, etc.

Exemplarily, in an embodiment of the present disclosure, the above-mentioned safety apparatus may include a group of first clamping slots on the passenger delivery berth and another group of second clamping slots on the passenger reception berth. When the second cabin is placed on the passenger delivery berth on the lifting platform of the shuttle vehicle, the second cabin may be fixed on the lifting platform through the first clamping slot. Since the second cabin is fixed to the lifting platform through the first clamping slot, when the shuttle vehicle accelerates and the lifting platform ascends, the safety of the second cabin may be guaranteed to prevent the second cabin from sliding off the lifting platform.

When the driving speed of the shuttle vehicle is consistent with the flight speed of the unmanned aerial vehicle, the shuttle vehicle is directly below the unmanned aerial vehicle, the ascending altitude of the lifting platform is consistent with the flight altitude of the unmanned aerial vehicle, and the shuttle vehicle and the unmanned aerial vehicle are kept in a relatively static state, the unmanned aerial vehicle may be separated from the first cabin carried by the unmanned aerial vehicle, and place the separated first cabin on the passenger reception berth. At this point, the lifting platform may fix the first cabin on the lifting platform through the second clamping slot in the same way.

In addition, when the unmanned aerial vehicle requires to acquire the second cabin located in the passenger delivery berth, the unmanned aerial vehicle may control the first clamping slot arranged on the lifting platform to be separated from the second cabin, so that the unmanned aerial vehicle may acquire the second cabin.

In embodiments of the present disclosure, the cabin may be fixed on the lifting platform of the shuttle vehicle through the safety apparatus such as the clamping slot, so as to ensure the safety of the cabin in the transportation process. In addition, when the unmanned aerial vehicle requires to grasp the cabin and to be combined with the cabin, the clamping slot may be controlled to open to ensure that the cabin and the lifting platform may be separated quickly and easily.

Through embodiments of the present disclosure, since the safety apparatus is used to connect the cabin and the lifting platform, the safety of the cabin may be guaranteed.

Embodiments of the present disclosure disclose a method for controlling an unmanned aerial vehicle.

FIG. 6 schematically shows a flowchart of a method for controlling an unmanned aerial vehicle according to embodiments of the present disclosure.

As shown in FIG. 6, the method may include operation S601 to operation S603.

In operation S601, the unmanned aerial vehicle is controlled to be aligned with a the ground orbit in a destination site and continue to fly at a predetermined flight altitude, in response to the unmanned aerial vehicle flying to a first preset airspace near the destination site.

In the operation, the first preset airspace may be a pre-defined airspace according to the actual situation. The ground orbit may be a straight ground orbit or a curved ground orbit, and a plurality of ground orbits may be provided in one site. The predetermined flight altitude may include an original flight altitude of the unmanned aerial vehicle, or a flight altitude of the unmanned aerial vehicle after descending a certain altitude on the basis of the original flight altitude, or a flight altitude of the unmanned aerial vehicle after ascending a certain altitude on the basis of the original flight altitude.

Exemplarily, according to embodiments of the present disclosure, the controlling the unmanned aerial vehicle to continue to fly at a predetermined flight altitude may include, but not limited to, any one of:

controlling the unmanned aerial vehicle to maintain the original flight altitude and continue to fly at a constant speed at the original flight speed, or controlling the unmanned aerial vehicle to maintain the original flight altitude, reduce a certain speed on the basis of the original flight speed as the flight speed, and fly at a constant speed at the reduced flight speed, or controlling the unmanned aerial vehicle to maintain the original flight altitude, increase a certain speed on the basis of the original flight speed as the flight speed, and fly at a constant speed at the accelerated flight speed, or controlling the unmanned aerial vehicle to lower a certain altitude on the basis of the original flight altitude as the flight altitude, and continue to fly at a constant speed at the original flight speed, or controlling the unmanned aerial vehicle to lower a certain altitude on the basis of the original flight altitude as the flight altitude, reduce a certain speed on the basis of the original flight speed as the flight speed, and fly at a constant speed at the reduced flight speed, or controlling the unmanned aerial vehicle to lower a certain altitude on the basis of the original flight altitude as the flight altitude, increase a certain speed on the basis of the original flight speed as the flight speed, and fly at a constant speed at the accelerated flight speed, or controlling the unmanned aerial vehicle to ascend a certain altitude on the basis of the original flight altitude as the flight altitude, and continue to fly at a constant speed at the original flight speed, or controlling the unmanned aerial vehicle to ascend a certain altitude on the basis of the original flight altitude as the flight altitude, and reduce a certain speed on the basis of the original flight speed as the flight speed, and fly at a constant speed at the reduced flight speed, or controlling the unmanned aerial vehicle to ascend a certain altitude on the basis of the original flight altitude as the flight altitude, increase a certain speed on the basis of the original flight speed as the flight speed, and fly at a constant speed at the accelerated flight speed.

In operation S602, the unmanned aerial vehicle is controlled to be separated from the first cabin carried by the unmanned aerial vehicle and place the separated first cabin on a first berth of a lifting platform of a shuttle vehicle driving along the ground orbit and the unmanned aerial vehicle is controlled to be combined with the second cabin carried on the second berth of the lifting platform, in response to the unmanned aerial vehicle flying to a position directly above the first berth and being in a relatively static state with the shuttle vehicle.

In the operation, both the first cabin and the second cabin may include a detachable cargo compartment, a detachable passenger cabin or the like.

In an embodiment of the present disclosure, the controlling the unmanned aerial vehicle to be combined with the second cabin carried on the second berth of the lifting platform may include: in a case that the second berth is positioned at a position of the lifting platform close to the vehicle head and the first berth is positioned at a position of the lifting platform close to the vehicle tail, after the unmanned aerial vehicle has unloaded the cabin carried by the unmanned aerial vehicle on the first berth, the unmanned aerial vehicle may be controlled to accelerate and then decelerate until the unmanned aerial vehicle is directly above the second berth, and the flight speed of the unmanned aerial vehicle is consistent with the speed of the shuttle vehicle, then the unmanned aerial vehicle is controlled to fly at a constant speed at the current speed, so that the unmanned aerial vehicle and the shuttle vehicle are in a relatively static state again.

Alternatively, in another embodiment of the present disclosure, the controlling the unmanned aerial vehicle to be combined with the second cabin carried on the second berth of the lifting platform may include: in a case that the second berth is positioned at a position of the lifting platform close to the vehicle tail and the first berth is positioned at a position of the lifting platform close to the vehicle head, after the unmanned aerial vehicle has unloaded the cabin carried by the unmanned aerial vehicle on the first berth, the unmanned aerial vehicle may be controlled to decelerate first and then accelerate until the unmanned aerial vehicle is directly above the second berth, and the flight speed of the unmanned aerial vehicle is consistent with the speed of the shuttle vehicle, then the unmanned aerial vehicle is controlled to fly at a constant speed at the current speed, so that the unmanned aerial vehicle and the shuttle vehicle are in a relatively static state again.

Alternatively, in another embodiment of the present disclosure, the controlling the unmanned aerial vehicle to be combined with the second cabin carried on the second berth of the lifting platform may further include: in response to the unmanned aerial vehicle being separated from the first cabin carried by the unmanned aerial vehicle and placing the separated first cabin on the first berth, controlling the unmanned aerial vehicle to fly at a constant speed, and adjusting the speed of the shuttle vehicle until the speed of the shuttle vehicle and the flight speed of the unmanned aerial vehicle are consistent again, and the unmanned aerial vehicle is directly above the second berth on the shuttle vehicle, controlling the shuttle vehicle to drive at a constant speed at the current speed, so that the shuttle vehicle and the unmanned aerial vehicle may be kept a relatively static state.

It should be noted that the above-mentioned method for controlling a shuttle vehicle will be described in detail in the following relevant embodiments of the present disclosure, which will not be repeated here.

In operation S603, the unmanned aerial vehicle is controlled to fly to a next destination site, in response to a completion of the combination of the unmanned aerial vehicle and the second cabin.

Exemplarily, according to embodiments of the present disclosure, during the process of the unmanned aerial vehicle carrying a passenger from a departure site to a destination site through the separable first cabin, in response to the unmanned aerial vehicle flying to a certain airspace near the destination site, the unmanned aerial vehicle may be controlled to be aligned with a ground orbit in the destination site, and reduce a certain altitude on the basis of the original flight altitude as the flight altitude, and reduce a certain speed on the basis of the original flight speed as the flight speed, and then fly at a constant speed at the reduced flight speed.

The shuttle vehicle carried with another cabin (the second cabin) in the destination site may be controlled to accelerate on the ground orbit aligned by the unmanned aerial vehicle, and the lifting platform on the shuttle vehicle is controlled to start to ascend.

When the unmanned aerial vehicle flies at a constant speed along the ground orbit, in response to the driving speed of the shuttle vehicle being consistent with the flight speed of the unmanned aerial vehicle, the altitude of the lifting platform being consistent with the flight altitude of the unmanned aerial vehicle, and the first berth on the lifting platform being directly below the unmanned aerial vehicle, the shuttle vehicle is controlled to drive at a constant speed, so that the shuttle vehicle and the unmanned aerial vehicle may be kept a relatively static state. In a case that the shuttle vehicle and the unmanned aerial vehicle are in a relatively static state, the unmanned aerial vehicle may be controlled to be separated from the first cabin and place the separated first cabin on the first berth on the lifting platform of the shuttle vehicle.

When the second berth is positioned at a position of the lifting platform close to the vehicle tail and the first berth is positioned at a position of the lifting platform close to the vehicle head, in response to the unmanned aerial vehicle being separated from the first cabin and placing the separated first cabin on the first berth on the lifting platform of the shuttle vehicle, the unmanned aerial vehicle may be controlled to decelerate and then accelerate until the unmanned aerial vehicle is directly above the second berth and the flight speed of the unmanned aerial vehicle is consistent with the speed of the shuttle vehicle, then the unmanned aerial vehicle is controlled to maintain the speed, so that the unmanned aerial vehicle and the shuttle vehicle are in a relatively static state again.

Then the unmanned aerial vehicle is controlled to be combined with the second cabin on the second berth, and then the unmanned aerial vehicle carried with the second cabin is controlled to fly to a next destination site.

It should be noted that the above-mentioned method for controlling a shuttle vehicle will be described in detail in the following relevant embodiments of the present disclosure, which will not be repeated here.

In the embodiment, the unmanned aerial vehicle cooperates with the shuttle vehicle in the site to complete the replacement process of the cabin in the air by a mode of flying in the air at the predetermined flight altitude and the predetermined flight speed in the whole process. In the process, the unmanned aerial vehicle saves the process of ascending, descending, accelerating and decelerating, thereby saving energy and improving passenger carrying efficiency.

Through embodiments of the present disclosure, since a method that "when the unmanned aerial vehicle approaches the destination, the unmanned aerial vehicle is controlled to be aligned with the ground orbit in the destination site and continue to fly at the predetermined flight altitude; the unmanned aerial vehicle is controlled to be separated from the first cabin carried by the unmanned aerial vehicle and place the separated first cabin on the first berth, in response to that the unmanned aerial vehicle flying to a position directly above the first berth of the lifting platform of the shuttle vehicle driving along the ground orbit and being in a relatively static state with the shuttle vehicle; and the unmanned aerial vehicle is controlled to be combined with the second cabin carried on the second berth of the lifting platform" is adopted, during the process of the unmanned aerial vehicle carried with a passenger taking off and flying to other stations for landing, the unmanned aerial vehicle may send a passenger to the destination site and carry a new passenger from the site without having to go through the process of taking off and landing. In the process, the unmanned aerial vehicle saves the process of ascending, descending, accelerating and decelerating, thereby saving energy and improving passenger carrying efficiency.

Further, as an alternative embodiment, in the method for controlling an unmanned aerial vehicle, the controlling the unmanned aerial vehicle to be aligned with the ground orbit in the destination site and continue to fly at the predetermined flight altitude may include: controlling the unmanned aerial vehicle to be aligned with the ground orbit and maintain the original flight altitude and continue to fly at a constant speed at the original flight speed.

According to embodiments of the present disclosure, during the process of the unmanned aerial vehicle carrying the first cabin used for carrying a passenger from a site and flying to the destination site, in response to the unmanned aerial vehicle flying to a certain airspace near the destination site, the unmanned aerial vehicle is controlled to be aligned with a ground orbit in the destination site, and to maintain the original flight altitude and continue to fly at a constant speed at the original flight speed.

The shuttle vehicle carried with another cabin in the destination site may accelerate on the ground orbit aligned by the unmanned aerial vehicle, and control the lifting platform on the shuttle vehicle to start to ascend.

When the unmanned aerial vehicle flies along the ground orbit and maintains the original flight altitude at the constant speed, in response to the driving speed of the shuttle vehicle being consistent with the flight speed of the unmanned aerial vehicle, the altitude of the lifting platform being consistent with the flight altitude of the unmanned aerial vehicle, and the first berth on the lifting platform being directly below the above-mentioned unmanned aerial vehicle, and the shuttle vehicle and the unmanned aerial vehicle being kept in a relatively static state, the unmanned aerial vehicle is controlled to be separated from the first cabin, and place the separated first cabin on the first berth on the lifting platform of the shuttle vehicle.

Then the unmanned aerial vehicle is controlled to fly at a constant speed, and the speed of the shuttle vehicle is adjusted until the second berth on the shuttle vehicle is directly below the unmanned aerial vehicle, and the driving speed of the shuttle vehicle and the flight speed of the unmanned aerial vehicle reach the same speed again, and then the shuttle vehicle is controlled to drive at a constant speed, so that the unmanned aerial vehicle and the shuttle vehicle may be kept in a relatively static state again.

Then the unmanned aerial vehicle is controlled to be combined with the second cabin on the second berth, and the unmanned aerial vehicle is controlled to fly to a next destination site.

It should be noted that the above-mentioned method for controlling a shuttle vehicle will be described in detail in the following relevant embodiments of the present disclosure, which will not be repeated here.

In the embodiment, the unmanned aerial vehicle may cooperate with the shuttle vehicle in the site to complete the replacement process of the cabin in the air by a mode of flying in the air at the original flight altitude and the original flight speed in the whole process. On the basis of maintaining a constant speed and maintaining the flight altitude unchanged in the whole process, a passenger may be sent to the destination site and a new passenger may be carried from the site. In the process, the unmanned aerial vehicle saves the process of ascending, descending, accelerating and decelerating, thereby saving energy and improving passenger carrying efficiency.

Through embodiments of the present disclosure, since the method of controlling the unmanned aerial vehicle to maintain the original flight altitude and the original flight speed and cooperate with the shuttle vehicle in the site when the unmanned aerial vehicle approaches the destination station is adopted, the unmanned aerial vehicle may send a passenger to the destination site and carry a new passenger from the site while maintaining the same flight altitude and the same flight speed in the whole process. In the process, the unmanned aerial vehicle saves the process of ascending, descending, accelerating and decelerating, thereby saving energy and improving passenger carrying efficiency.

According to embodiments of the present disclosure, the controlling the unmanned aerial vehicle to be combined with the second cabin carried on the second berth of the lifting platform includes: controlling the unmanned aerial vehicle to adjust a speed until the unmanned aerial vehicle is directly above the second berth and the flight speed of the unmanned aerial vehicle is consistent with the driving speed of the shuttle vehicle again, so that the unmanned aerial vehicle and the shuttle vehicle may be kept in a relatively static state again. In response to the unmanned aerial vehicle and the shuttle vehicle being kept in a relatively static state again, the unmanned aerial vehicle is controlled to be combined with the second cabin.

Through embodiments of the present disclosure, in the process of the unmanned aerial vehicle being combined with the above-mentioned second cabin, the method of adjusting the flight speed of the unmanned aerial vehicle is adopted to make the unmanned aerial vehicle directly above the shuttle vehicle and maintain a relatively static state again with the shuttle vehicle, so that the unmanned aerial vehicle may complete the grab of the cabin by adjusting the speed without landing and taking off, thereby saving energy and time, and improving efficiency.

According to embodiments of the present disclosure, the method for controlling an unmanned aerial vehicle further includes providing the unmanned aerial vehicle with energy supply through a backup battery carried in the second cabin.

The backup battery carried in the second cabin may include an electric energy storage unit that may be removed from the second cabin, or an electric energy storage unit that may not be removed from the second cabin.

Through embodiments of the present disclosure, since the backup battery carried in the second cabin may provide energy supply for the unmanned aerial vehicle, after the unmanned aerial vehicle replaces the cabin in the air, the unmanned aerial vehicle may supplement energy from the electric energy stored in the backup battery in the replaced cabin (the second cabin), which makes the unmanned aerial vehicle not required to land on the ground to supplement energy, thus saving time and improving work efficiency.

Further, according to embodiments of the present disclosure, as shown in FIG. 7, the process of providing the unmanned aerial vehicle with energy supply through the backup battery carried in the second cabin may include operation S701 to operation S704.

In operation S701, a power supply equipment of the unmanned aerial vehicle is controlled to be switched from an original battery to a temporary power supply apparatus, in response to an electric quantity balance of the original battery of the unmanned aerial vehicle being lower than a preset value.

It should be noted that in embodiments of the present disclosure, the above-mentioned preset value may be set to be 20%, 30%, or other values, which are not limited here.

Then, in operating S702, the unmanned aerial vehicle is controlled to open a battery compartment and release the original battery into the second cabin, in response to the power supply equipment being switched from the original battery to the temporary power supply apparatus.

In the operation, the temporary power supply apparatus may be a battery carried by the unmanned aerial vehicle for temporary power supply.

Next, in operation S703, the unmanned aerial vehicle is controlled to acquire the backup battery into the battery compartment, in response to the original battery being released into the second cabin.

Next, in operation S704, the power supply equipment of the unmanned aerial vehicle is controlled to be switched from the temporary power supply apparatus to the backup battery, in response to the backup battery being acquired into the battery compartment.

Exemplarily, in an embodiment, during the process of the unmanned aerial vehicle carrying a passenger from one site and flying to the destination site, the unmanned aerial vehicle is powered through the original battery. In response to the electric quantity balance of the original battery being less than 30%, the power supply equipment of the unmanned aerial vehicle is controlled to be switched to the temporary power supply apparatus.

When the unmanned aerial vehicle flies to a certain airspace near the destination site, the unmanned aerial vehicle is controlled to fly in alignment with a ground orbit in the site, then in respond to the shuttle vehicle driving on the ground orbit being directly below the unmanned aerial vehicle and being kept in a relatively static state with the unmanned aerial vehicle, and the lifting platform on the shuttle vehicle being consistent with the flight altitude of the unmanned aerial vehicle, the unmanned aerial vehicle is controlled to be separated from the first cabin and then to be combined with the second cabin.

In response to the second cabin being combined with the unmanned aerial vehicle, the unmanned aerial vehicle is controlled to open the battery compartment to release the original battery into the second cabin, and then acquire the backup battery carried in the second cabin into the battery compartment. Then the power supply equipment of the unmanned aerial vehicle is controlled to be switched from the temporary power supply apparatus to the battery (i.e., the backup battery) currently installed in the battery compartment.

In the embodiment, the unmanned aerial vehicle may replace the power supply battery in the air by completing the replacement of the cabin in the air during the flight, so that the unmanned aerial vehicle may supplement energy without landing on the ground, which may save time and improve the work efficiency.

Through embodiments of the present disclosure, when the electric quantity balance of the original battery of the unmanned aerial vehicle is lower than the preset value, the power supply equipment is switched to the temporary power supply apparatus, and the replacement of the cabin is completed in the air, and then the replacement of the power supply battery is completed in the air, which may ensure that the unmanned aerial vehicle may maintain a normal flight when the battery balance is lower than the preset value during flight. Since the unmanned aerial vehicle may replace the cabin in the air, the unmanned aerial vehicle may supplement energy without landing on the ground, which thus may save time and improve efficiency.

Embodiments of the present disclosure disclose a method for controlling a shuttle vehicle.

FIG. 8 schematically shows a flowchart of a method for controlling a shuttle vehicle according to an embodiment of the present disclosure.

As shown in FIG. 8, the method may include operation S801 to operation S804.

In operation S801, the shuttle vehicle carried with the second cabin is controlled to accelerate on the ground orbit in the destination site and the lifting platform of the shuttle vehicle is controlled to start to ascend, in response to the unmanned aerial vehicle flying to the second preset airspace near the destination site. The unmanned aerial vehicle is carried with the first cabin that is separable from a fuselage, and the unmanned aerial vehicle above the destination site is aligned with the ground orbit and flies at the predetermined flight altitude, and the second cabin is placed on the second berth on the lifting platform.

In the operation, the second preset airspace may be a pre-defined airspace according to the actual situation. A space relationship between the second preset airspace and the first preset airspace in the preceding embodiments may be as follows.

According to an embodiment of the present disclosure, the first preset airspace and the second preset airspace are a same preset airspace.

According to another embodiment of the present disclosure, the first preset airspace is closer to the destination site than the second preset airspace.

According to another embodiment of the present disclosure, the first preset airspace is farther from the destination site than the second preset airspace.

In addition, in the operation, the controlling the shuttle vehicle to accelerate and controlling the lifting platform to ascend may include: first controlling the shuttle vehicle to accelerate, and then controlling the lifting platform to ascend; or, first controlling the lifting platform to ascend, and then controlling the shuttle vehicle to accelerate; or, simultaneously controlling the lifting platform to ascend and controlling the shuttle vehicle to accelerate.

In operation S802, the lifting platform is controlled to stop ascending, in response to the lifting platform ascending to the flight altitude of the unmanned aerial vehicle.

In the operation, the flight altitude of unmanned aerial vehicle refers to a flight altitude at which the unmanned aerial vehicle is aligned with the ground orbit in the destination site and flies at the predetermined flight altitude.

In operation S803, the shuttle vehicle is controlled to keep the current speed and drive at a constant speed on the ground orbit, in response to the driving speed of the shuttle vehicle reaching the flight speed of the unmanned aerial vehicle and the first berth on the lifting platform being directly below the unmanned aerial vehicle, so as to keep the shuttle vehicle and the unmanned aerial vehicle in a relatively static state, so that the unmanned aerial vehicle may place the separated first cabin on the first berth.

In operation S804, the shuttle vehicle is controlled to adjust a speed until the second berth on the lifting platform is directly below the unmanned aerial vehicle and the driving speed of the shuttle vehicle reaches the flight speed of the unmanned aerial vehicle again, in response to the first cabin being placed on the first berth, so that the shuttle vehicle and the unmanned aerial vehicle are kept in a relatively static state again, and the unmanned aerial vehicle may be combined with the second cabin and send the second cabin to a next destination site.

In the operation, the first berth and the second berth are located on the lifting platform of the shuttle vehicle.

According to an embodiment of the present disclosure, a berth relationship between the first berth and the second berth is that: the first berth is located at a position of the lifting platform close to the vehicle head, and the second berth is located at a position of the lifting platform close to the vehicle tail.

According to another embodiment of the present disclosure, a berth relationship between the first berth and the second berth is that: the first berth is located at a position of the lifting platform close to the vehicle tail, and the second berth is located at a position of the lifting platform close to the vehicle head.

In addition, in the operation, the controlling the shuttle vehicle to adjust the speed may be that: for example, in an embodiment, in a case that the second berth is located at a position of the lifting platform close to the vehicle tail, the first berth is located at a position of the lifting platform close to the vehicle head, and the unmanned aerial vehicle continuously keeps flying at a constant speed, in response to the unmanned aerial vehicle being separated from the first cabin and placing the separated first cabin on the first berth on the lifting platform of the shuttle vehicle, the shuttle vehicle may be controlled to accelerate and then decelerate until the second berth is directly below the unmanned aerial vehicle and the driving speed of the shuttle vehicle reaches the flight speed of the unmanned aerial vehicle again, and then the shuttle vehicle may be controlled to drive at a constant speed so that the shuttle vehicle and the unmanned aerial vehicle may reach a relatively static state again.

Alternatively, in another embodiment, the controlling the shuttle vehicle to adjust the speed may be that: in a case that the second berth is located at a position of the lifting platform close to the vehicle head, the first berth is located at a position of the lifting platform close to the vehicle tail, and the unmanned aerial vehicle continuously keeps flying at a constant speed, in response to the unmanned aerial vehicle being separated from the first cabin, and placing the separated first cabin on the first berth on the lifting platform of the shuttle vehicle, the shuttle vehicle may be controlled to decelerate and then accelerate until the second berth is directly below the unmanned aerial vehicle and the driving speed of the shuttle vehicle reaches the flight speed of the unmanned aerial vehicle again, and then the shuttle vehicle may be controlled to drive at a constant speed so that the shuttle vehicle and the unmanned aerial vehicle may reach a relatively static state again.

Alternatively, in another embodiment, the controlling the shuttle vehicle to adjust the speed may be that: in response to the unmanned aerial vehicle being separated from the first cabin, and placing the separated first cabin on the first berth on the lifting platform of the shuttle vehicle, the shuttle vehicle is controlled to drive at the original speed, and the flight speed of the unmanned aerial vehicle is adjusted until the second berth is directly below the unmanned aerial vehicle and the flight speed of the unmanned aerial vehicle reaches the driving speed of the shuttle vehicle again, and then the unmanned aerial vehicle is controlled to fly at a constant speed so that the shuttle vehicle and unmanned aerial vehicle may reach a relatively static state again.

Exemplarily, according to an embodiment of the present disclosure, the unmanned aerial vehicle carried with the first cabin flies to the first airspace near the destination site, and the unmanned aerial vehicle is aligned with a ground orbit in the destination site, and maintains the original flight altitude and the original flight speed and flies at a constant speed.

In response to the unmanned aerial vehicle flying to the second airspace closer to the destination site, the shuttle vehicle carried with the second cabin is controlled to accelerate on the ground orbit aligned by the unmanned aerial vehicle, and the lifting platform on the shuttle vehicle is controlled to start to ascend.

In response to the driving speed of the shuttle vehicle reaching the flight speed of the unmanned aerial vehicle, the shuttle vehicle is controlled to keep the current speed and drive at a constant speed, so as to keep the shuttle vehicle and the unmanned aerial vehicle in a relatively static state. In response to the lifting platform ascending to the flight altitude of the unmanned aerial vehicle, the lifting platform is controlled to stop ascending.

Then, in a case that the second berth is located at a position of the lifting platform close to the vehicle head, the first berth is located at a position of the lifting platform close to the vehicle tail, and the unmanned aerial vehicle keeps flying at a constant speed, in response to the first cabin on the unmanned aerial vehicle being placed on the first berth on the shuttle vehicle, the shuttle vehicle is controlled to decelerate first and then accelerate until the second berth is directly below the unmanned aerial vehicle and the driving speed of the shuttle vehicle reaches the flight speed of the unmanned aerial vehicle again. Then the shuttle vehicle keeps driving at a constant speed, so that the shuttle vehicle and the unmanned aerial vehicle may be kept in a relatively static state again.

In response to a completion of the combination of the unmanned aerial vehicle and the second cabin, the lifting apparatus of the shuttle vehicle is controlled to descend and the shuttle vehicle is controlled to decelerate. The shuttle vehicle decelerates to zero and stops at a platform of the site. The passenger comes out of the first cabin and then exits from the exit, and the journey ends.

In the embodiment, the unmanned aerial vehicle maintains the original flight altitude and flies at the original speed, and after the shuttle vehicle is controlled to accelerate, in a case that the second berth is located at a position of the lifting platform close to the vehicle head, the first berth is located at a position of the lifting platform close to the vehicle tail, and the unmanned aerial vehicle continuously keeps flying at a constant speed, in response to the unmanned aerial vehicle being separated from the first cabin, and placing the separated first cabin on the first berth on the lifting platform of the shuttle vehicle, the shuttle vehicle is controlled to adjust the speed until the second berth is directly above the unmanned aerial vehicle, and the driving speed of the shuttle vehicle is consistent with the flight speed of the unmanned aerial vehicle again, and then the shuttle vehicle maintains a constant speed so that the shuttle vehicle and the unmanned aerial vehicle are kept in a relatively static state again. During the process, the unmanned aerial vehicle maintains a constant speed at the original flight altitude and the original flight speed. The lifting platform on the shuttle vehicle ascends to the flight altitude of the unmanned aerial vehicle, so that the second cabin on the lifting platform carried by the shuttle vehicle may be acquired by the unmanned aerial vehicle, and the first cabin carried by the unmanned aerial vehicle may be placed on the lifting platform. Therefore, the unmanned aerial vehicle may complete the operation of replacing the cabin while maintaining the original flight altitude, thereby reducing the energy consumption of unmanned aerial vehicle, and saving time and improving efficiency.

It should be noted that the above-mentioned method for controlling an unmanned aerial vehicle is described in detail in the above-mentioned relevant embodiments of the present disclosure, and embodiments of the present disclosure will not be repeated here.

Through embodiments of the present disclosure, when the unmanned aerial vehicle flies near the site, since the method of controlling the driving speed of the shuttle vehicle and the ascending and descending of the lifting platform is adopted, through the ascending and descending of the lifting platform on the shuttle vehicle, the first cabin carried by the unmanned aerial vehicle may be placed on the lifting platform, and the second cabin on the lifting platform of the shuttle vehicle may be grabbed by the unmanned aerial vehicle, so that the replacement of the cabin of the unmanned aerial vehicle may be completed while maintaining the predetermined flight altitude. Then, the unmanned aerial vehicle may send a passenger to the destination site and carry a new passenger from the site without having to go through the process of taking off and landing. In the process, the unmanned aerial vehicle saves the process of ascending, descending, accelerating and decelerating, thereby saving energy and improving passenger carrying efficiency.

Further, as an alternative embodiment, the controlling the unmanned aerial vehicle to be aligned with the ground orbit in the destination site and continue to fly at the predetermined flight altitude includes: the ground orbit is a straight ground orbit.

According to an embodiment of the present disclosure, when the unmanned aerial vehicle flies near the site, the unmanned aerial vehicle is controlled to be aligned with the straight ground orbit in the destination site, and maintain the original flight altitude and the original flight speed and fly at a constant speed. The shuttle vehicle may be controlled to accelerate on the ground orbit aligned by the unmanned aerial vehicle, and the lifting platform on the shuttle vehicle may be controlled to start to ascend.

In embodiments of the present disclosure, when the unmanned aerial vehicle flies near the destination site, the unmanned aerial vehicle flies along a straight ground orbit, which may reduce the number of turns during the flight, thus reducing the energy consumption as much as possible.

According to embodiments of the present disclosure, when the unmanned aerial vehicle flies near the site, since the method of controlling the unmanned aerial vehicle to fly in alignment with the straight ground orbit is adopted, the unmanned aerial vehicle may maintain the straight flight during the flight process, thus reducing the energy consumption caused by accelerating, decelerating, and turning.

According to embodiments of the present disclosure, the method for controlling a shuttle vehicle further includes: controlling the shuttle vehicle to decelerate on the ground orbit and control the lifting platform to start to descend in response to the second cabin being separated from the lifting platform, so as to transport a passenger and/or cargo in the first cabin to the exit of the destination site.

The controlling the shuttle vehicle to decelerate on the ground orbit and controlling the lifting platform to start descending may include: first controlling the shuttle vehicle to decelerate, and then controlling the lifting platform of the shuttle vehicle to start descending; or, first controlling the lifting platform of the shuttle vehicle to start descending, and then controlling the shuttle vehicle to start decelerating; or, simultaneously controlling the lifting platform of the shuttle vehicle to start descending and the shuttle vehicle to start decelerating.

Exemplarily, in an embodiment, in response to the safety apparatus of the second cabin being separated from the lifting platform of the shuttle vehicle, the lifting platform of the shuttle vehicle may be controlled to start descending firstly, and when the lifting platform descends to a certain altitude, the shuttle vehicle is controlled to start decelerating. When the speed of the shuttle vehicle is zero and the lifting platform descends to the initial altitude, the shuttle vehicle will stop at the exit of the destination site, and then the passenger in the first cabin will exit, and the journey ends. The controlling the lifting platform to descend a certain altitude may include descending a altitude of one cabin, or descending a altitude of one and a half cabins, etc.

In the embodiment, the lifting platform of the shuttle vehicle is controlled to descend to a certain altitude, and then the shuttle vehicle is controlled to start decelerating, so that the unmanned aerial vehicle may avoid a collision between the first cabin and the second cabin while keeping the original flight altitude and continuing to fly at the original flight speed, and the safety of the unmanned aerial vehicle, the shuttle vehicle, the passenger and/or the cargo may be ensured.

According to embodiments of the present disclosure, controlling the unmanned aerial vehicle to be separated from the first cabin and place the separated first cabin on the first berth may further include: fixing the first cabin by the safety apparatus arranged on the first berth, in response to the first cabin being placed on the first berth.

In the operation, the safety apparatus may include a fixing apparatus installed on the lifting platform, such as a chain; or fixing apparatuses installed on the lifting platform and at the bottom of the cabin that may correspond to each other, such as a guide rail, a groove, a clamping slot, etc.

Through embodiments of the present disclosure, the safety apparatus is used to fix the first cabin, which may prevent the first cabin from sliding off the lifting platform in the driving process of the shuttle vehicle, thus ensuring the safety of the cargo and/or the passenger.

According to embodiments of the present disclosure, the method may further include: releasing a fixing effect of the safety apparatus arranged at the second berth on the second cabin, in response to the shuttle vehicle and the unmanned aerial vehicle being in a relatively static state again.

In the operation, the above-mentioned safety apparatus may include a fixing apparatus installed on the lifting platform, such as a chain; or fixing apparatuses installed on the lifting platform and at the bottom of the cabin that may correspond to each other, such as a guide rail, a groove, a clamping slot, etc.

According to embodiments of the present disclosure, since the safety apparatus is used to fix the second cabin on the shuttle vehicle, and the fixing effect of the safety apparatus on the second cabin may be released, so that in addition to ensuring the safety of the second cabin during transportation, a fixation of the safety apparatus on the second cabin may be relieved when the unmanned aircraft is about to acquire the second cabin.

Embodiments of the present disclosure disclose an apparatus for controlling an unmanned aerial vehicle.

Figure 9:
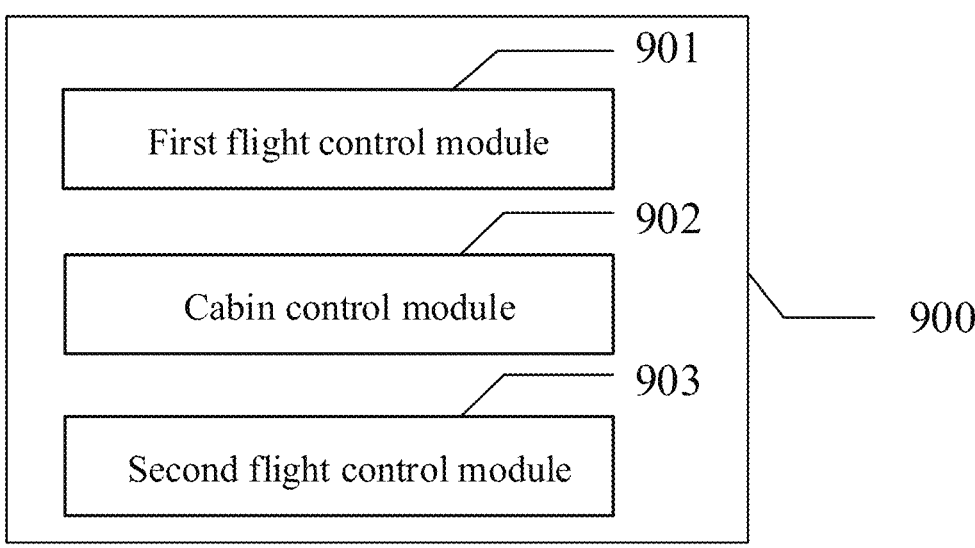
FIG. 9 schematically shows a block diagram of an apparatus for controlling an unmanned aerial vehicle according to embodiments of the present disclosure.

FIG. 9 schematically shows a block diagram of an apparatus for controlling an unmanned aerial vehicle according to embodiments of the present disclosure.

As shown in FIG. 9, an apparatus 900 may include a first flight control module 901, a cabin control module 902, and a second flight control module 903.

The first flight control module 901 is used to control the unmanned aerial vehicle to be aligned with a ground orbit in a destination site and continue to fly at a predetermined flight altitude, in response to the unmanned aerial vehicle flying to a first preset airspace near the destination site.

The cabin control module 902 is used to control the unmanned aerial vehicle to be separated from a first cabin carried by the unmanned aerial vehicle and place the separated first cabin at a first position of a lifting platform of a shuttle vehicle driving along the ground orbit and control the unmanned aerial vehicle to be combined with a second cabin carried at a second position of the lifting platform, in response to the unmanned aerial vehicle flying to a position directly above the first position and being in a relatively static state with the shuttle vehicle.

The second flight control module 903 is used to control the unmanned aerial vehicle to fly to a next destination site, in response to a completion of the combination of the unmanned aerial vehicle and the second cabin.

Through embodiments of the present disclosure, since the method of controlling the unmanned aerial vehicle to maintain the original flight altitude and the original flight speed and cooperate with the shuttle vehicle in the site when the unmanned aerial vehicle approaches the destination station, is adopted, the unmanned aerial vehicle may send a passenger to the destination site and carry a new passenger from the site while maintaining the same flight altitude and the same flight speed throughout the flight. In the process, the unmanned aerial vehicle saves the process of ascending, descending, accelerating and decelerating, thereby saving energy and improving passenger carrying efficiency.

Embodiments of the present disclosure disclose an apparatus for controlling a shuttle vehicle.

Figure 10:
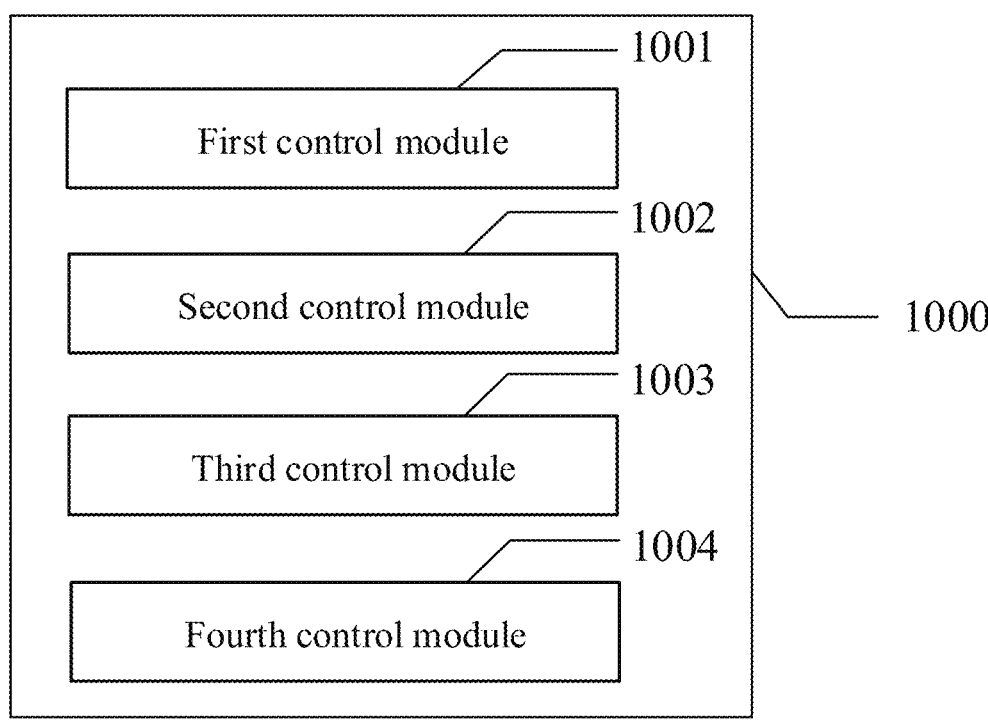
FIG. 10 schematically shows a block diagram of an apparatus for controlling a shuttle vehicle according to embodiments of the present disclosure.

FIG. 10 schematically shows a block diagram of an apparatus for controlling a shuttle vehicle according to embodiments of the present disclosure.

As shown in FIG. 10, the apparatus 1000 may include a first control module 1001, a second control module 1002, a third control module 1003 and a fourth control module 1004.

The first control module 1001 is used to control the shuttle vehicle carried with a second cabin to accelerate on a ground orbit in a destination site and controlling a lifting platform of the shuttle vehicle to start to ascend, in response to an unmanned aerial vehicle flying to a second preset airspace near the destination site, wherein the unmanned aerial vehicle is carried with a first cabin being separable from a fuselage, and the unmanned aerial vehicle above the destination site is aligned with the ground orbit and flies at a predetermined flight altitude, and the second cabin is placed at a second position on the lifting platform.

The second control module 1002 is used to control the lifting platform to stop ascending, in response to the lifting platform ascending to a flight altitude of the unmanned aerial vehicle.

The third control module 1003 is used to control the shuttle vehicle to keep a current speed to drive at a constant speed on the ground orbit, in response to a driving speed of the shuttle vehicle reaching a flight speed of the unmanned aerial vehicle and a first position on the lifting platform being directly below the unmanned aerial vehicle, so as to keep the shuttle vehicle and the unmanned aerial vehicle in a relatively static state, and enable the unmanned aerial vehicle to place the separated first cabin on the first position.

The fourth control module 1004 is used to control the shuttle vehicle to adjust a speed until the second position on the lifting platform is located directly below the unmanned aerial vehicle and the driving speed of the shuttle vehicle reaches the flight speed of the unmanned aerial vehicle again, in response to the first cabin being placed on the first position, so as to keep the shuttle vehicle and the unmanned aerial vehicle in a relatively static state again, and enable the unmanned aerial vehicle to be combined with the second cabin and send the second cabin to a next destination site.

Through embodiments of the present disclosure, when the unmanned aerial vehicle flies near the site, due to the method of controlling the driving speed of the shuttle vehicle and the ascending and descending of the lifting platform, the first cabin carried by the unmanned aerial vehicle may be placed on the lifting platform through the ascending and descending of the lifting platform on the shuttle vehicle, and the second cabin on the lifting platform of the shuttle vehicle may be grabbed by the unmanned aerial vehicle, so that the replacement of the cabin of the unmanned aerial vehicle may be completed while maintaining the predetermined flight altitude. Then, the unmanned aerial vehicle may send passengers to the destination site and carry new passengers from the site without having to go through the process of taking off and landing. In the process, the unmanned aerial vehicle saves the process of ascending, descending, accelerating and decelerating, thereby saving energy and improving passenger carrying efficiency.

According to embodiments of the present disclosure, since the following technical means are adopted, that is, when the unmanned aerial vehicle carries a separable cabin and approaches the destination site, another separable cabin carrying passengers/cargoes at the destination site is transported to the flight altitude of the unmanned aerial vehicle through the lifting apparatus of the shuttle vehicle in the destination site, so that the unmanned aerial vehicle may place the separable cabin carried by the unmanned aerial vehicle on the lifting platform of the lifting apparatus, and then grab the separable cabin transported by the shuttle vehicle and fly directly to a next destination site without landing and taking off at the site, the present disclosure at least partially overcome the technical problems of low passenger carrying efficiency and high energy consumption caused by the process of landing first, putting down passengers/cargos going to the site, and then carrying passengers/cargos going from the site to other sites and taking off, thus achieving the technical effect that unmanned aerial vehicle may carry passengers efficiently and save energy.

Any number of modules, or at least part of the function of any number thereof according to embodiments of the present disclosure may be implemented in one module. Any one or more of the modules according to embodiments of the present disclosure may be divided into a plurality of modules for implementation. Any one or more of the modules according to embodiments of the present disclosure may be implemented at least partially as a hardware circuit, such as a field programmable gate array (FPGA), a programmable logic array (PLA), a system on a chip, a system on a substrate, a system on a package, an application specific integrated circuit (ASIC), or may be implemented by any other reasonable means of hardware or firmware that integrates or packages a circuit, or may be implemented in any one of or a suitable combination of three implementation methods of software, hardware, and firmware. Alternatively, one or more of the modules according to embodiments of the present disclosure may be implemented at least partially as a computer program module, which when executed, may perform a corresponding function.

For example, any number of the first flight control module 901, the cabin control module 902, and the second flight control module 903 may be combined into one module/unit/sub-unit to be implemented, or any one module/unit/sub-unit thereof may be divided into a plurality of modules/units/sub-units. Alternatively, at least part of the function of one or more of these modules/units/sub-units may be combined with at least part of the function of other modules/units/sub-units and implemented in one module/unit/sub-unit. According to embodiments of the present disclosure, at least one of the first flight control module 901, the cabin control module 902, and the second flight control module 903 may be implemented at least partially as a hardware circuit, such as a field programmable gate array (FPGA), a programmable logic array (PLA), a system on a chip, a system on a substrate, a system on a package, an application specific integrated circuit (ASIC), or may be implemented by any other reasonable means of hardware or firmware that integrates or packages a circuit, or may be implemented in any one of or a suitable combination of three implementation methods of software, hardware and firmware. Alternatively, at least one of the first flight control module 901, the cabin control module 902, and the second flight control module 903 may be implemented at least partially as a computer program module, which when executed, may perform a corresponding function.

It should be noted that, the implementation of each apparatus part in embodiments of the present disclosure are the same as or similar to the implementation of the corresponding method part in embodiments of the present disclosure, and the description of the implementation of each apparatus part specifically refers to the description of the implementation of the method part, which will not be repeated here.

Figure 11:
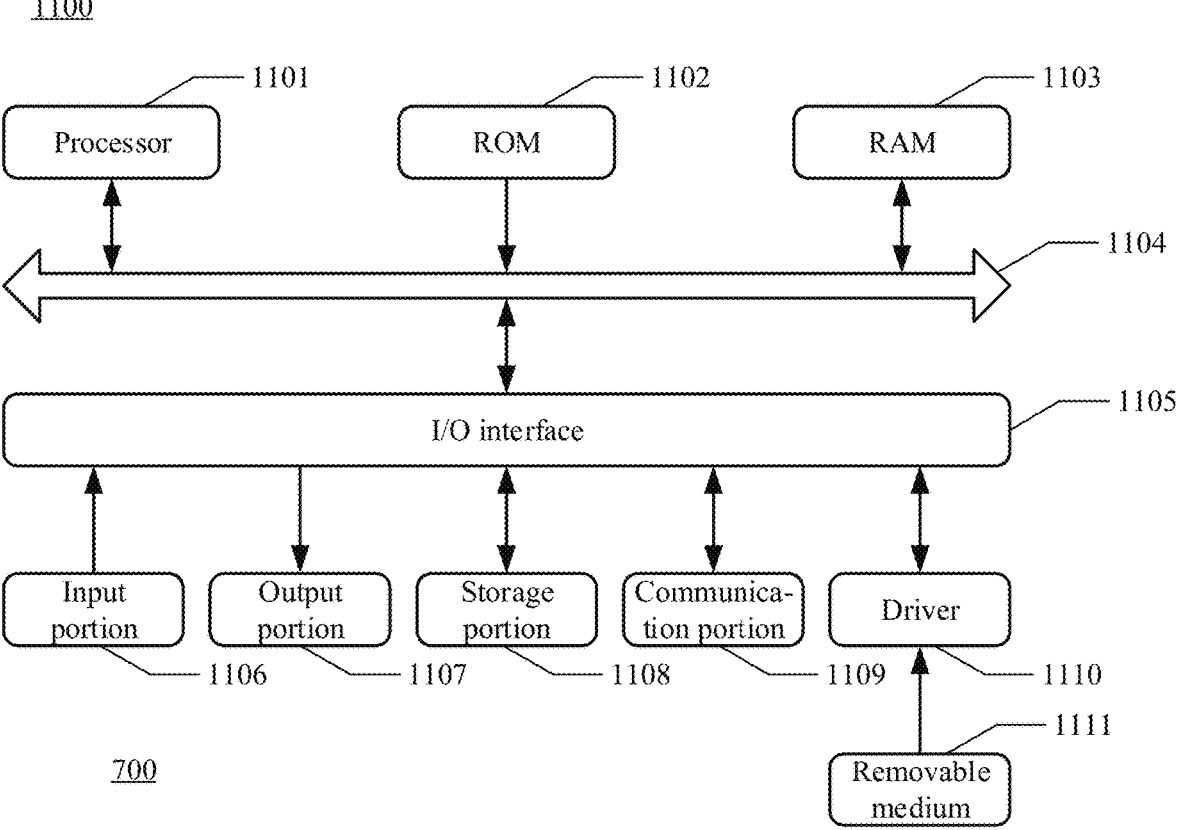
FIG. 11 schematically shows a block diagram of an electronic device according to embodiments of the present disclosure.

FIG. 11 schematically shows a block diagram of an electronic device adapted to implement the method described above according to embodiments of the present disclosure. The electronic device shown in FIG. 11 is only an example, and should not impose any limitation on the function and scope of use of embodiments of the present disclosure.

As shown in FIG. 11, the electronic device 1100 according to embodiments of the present disclosure includes a processor 1101 that may perform various appropriate actions and processes according to programs stored in a read-only memory (ROM) 1102 or programs loaded from a storage portion 1108 into a random access memory (RAM) 1103. The processor 1101 may include, for example, a general-purpose microprocessor (e.g., a CPU), an instruction set processor and/or a related chipset and/or a special-purpose microprocessor (e.g., an application-specific integrated circuit (ASIC)), etc. The processor 1101 may also include an on-board memory for caching purposes. The processor 1101 may include a single processing unit or a plurality of processing units for performing different actions of a method flow according to embodiments of the present disclosure.

In the RAM 1103, various programs and data required for the operation of the electronic device 1100 are stored. The processor 1101, the ROM 1102 and the RAM 1103 are connected to each other through a bus 1104. The processor 1101 performs various operations of the method flow according to embodiments of the present disclosure by executing the programs in the ROM 1102 and/or the RAM 1103. It should be noted that the programs may also be stored in one or more memories other than the ROM 1102 and the RAM 1103. The processor 1101 may also perform various operations of the method flow according to embodiments of the present disclosure by executing the programs stored in the one or more memories.

According to embodiments of the present disclosure, the electronic device 1100 may also include an input/output (I/O) interface 1105, and the input/output (I/O) interface 1105 is also connected to the bus 1104. The electronic device 1100 may also include one or more of the following components connected to the I/O interface 1105: an input portion 1106 including a keyboard, a mouse, etc.; an output portion 1107 including a cathode ray tube (CRT), a liquid crystal display (LCD), etc., and a speaker, etc.; a storage portion 1108 including a hard disk, etc.; and a communication portion 1109 including a network interface card such as a LAN card, a modem, etc. The communication portion 1109 performs communication processing via a network such as the Internet. A drive 1110 is also connected to the I/O interface 1105. A removable medium 1111, such as a magnetic disk, an optical disk, a magneto-optical disk, a semiconductor memory, etc., is mounted on the drive 1110 as needed so that a computer program read therefrom is installed into the storage portion 1108 as needed.

According to embodiments of the present disclosure, the method flow according to embodiments of the present disclosure may be implemented as a computer software program. For example, an embodiment of the present disclosure includes a computer program product including a computer program carried on a computer-readable medium, and the computer program contains program code for performing the method illustrated in the flowchart. In such an embodiment, the computer program may be downloaded from the network via the communication portion 1109 and installed, and/or installed from the removable medium 1111. The computer program, when executed by the processor 1101, performs the functions described above defined in the system of the embodiments of the present disclosure. According to embodiments of the present disclosure, the system, apparatus, apparatus, module, unit, etc. described above may be implemented by the computer program module.

The present disclosure further provides a computer-readable medium. The computer-readable medium may be included in the apparatus/apparatus/system described in the above-mentioned embodiments, and may also exist alone without being assembled into the apparatus/apparatus/system. The computer-readable medium described above carries one or more programs, and when the one or more programs are executed, the method according to embodiments of the present disclosure may be implemented.

According to embodiments of the present disclosure, the computer-readable medium may be a nonvolatile computer-readable storage medium. The computer-readable storage medium may include, for example, but are not limited to, a portable computer disk, a hard disk, a random access memory (RAM), a read only memory (ROM), an erasable programmable read only memory (EPROM or flash memory), a portable compact disk read only memory (CD-ROM), an optical storage apparatus, a magnetic storage apparatus, or any suitable combination of the above. In the present disclosure, the computer-readable storage medium may be any tangible medium that contains or stores a program that may be used by or in conjunction with an instruction execution system, apparatus, or apparatus.

For example, according to embodiments of the present disclosure, the computer-readable medium may include one or more memories other than the ROM 1102 and/or the RAM 1103 and/or the ROM 1102 and the RAM 1103 described above.

The flowcharts and block diagrams in the drawings illustrate the architecture, functionality, and operation of possible implementations of systems, methods and computer program products according to various embodiments of the present disclosure. In this regard, each block in the flowcharts or block diagrams may represent a module, program segment, or portion of code, which contains one or more executable instructions for implementing the specified logical function. It should also be noted that, in some alternative implementations, the functions noted in the blocks may occur out of the order noted in the drawings. For example, two blocks shown in succession may, in fact, be executed substantially concurrently, or the two blocks may sometimes be executed in a reverse order, depending upon the functionality involved. It should also be noted that each block of the block diagrams or flowcharts, and combinations of the blocks in the block diagrams or flowcharts, may be implemented by using a special purpose hardware-based system that performs the specified functions or operations, or may be implemented using a combination of a special purpose hardware and computer instructions.

Those skilled in the art will appreciate that features recited in the various embodiments of the present disclosure and/or the claims may be combined and/or incorporated in a variety of ways, even if such combinations or incorporations are not clearly recited in the present disclosure. In particular, the features recited in the various embodiments of the present disclosure and/or the claims may be combined and/or incorporated without departing from the spirit and teachings of the present disclosure, and all such combinations and/or incorporations fall within the scope of the present disclosure.

Embodiments of the present disclosure are described above. However, these embodiments are for illustrative purposes only, and are not intended to limit the scope of the present disclosure. Although the various embodiments are described above separately, this does not mean that the measures in the various embodiments may not be advantageously used in combination. The scope of the present disclosure is defined by the appended claims and their equivalents. Without departing from the scope of the present disclosure, those skilled in the art may make various substitutions and modifications, and these substitutions and modifications should all fall within the scope of the present disclosure.

What is claimed is:

1. A method for controlling an unmanned aerial vehicle, comprising:

controlling the unmanned aerial vehicle to be aligned with a ground orbit in a destination site and continue to fly at a predetermined flight altitude, in response to the unmanned aerial vehicle flying to a first preset airspace near the destination site;

controlling the unmanned aerial vehicle to be separated from a first cabin carried by the unmanned aerial vehicle and place the separated first cabin at a first position of a lifting platform of a shuttle vehicle driving along the ground orbit and controlling the unmanned aerial vehicle to be combined with a second cabin carried at a second position of the lifting platform, in response to the unmanned aerial vehicle flying to a position directly above the first position and being in a relatively static state with the shuttle vehicle; and controlling the unmanned aerial vehicle carrying the second cabin to fly to a next destination site, in response to a completion of the combination of the unmanned aerial vehicle and the second cabin, wherein the controlling the unmanned aerial vehicle to be aligned with a ground orbit in a destination site and continue to fly at a predetermined flight altitude comprises:

controlling the unmanned aerial vehicle to be aligned with the ground orbit, and controlling the unmanned aerial vehicle to maintain flying at the predetermined flight altitude to continue to fly at a constant speed at an original flight speed, so that the flight altitude of the unmanned aerial vehicle is maintained at the predetermined flight altitude unchanged throughout a whole process from unloading the first cabin to mounting the second cabin, wherein the controlling the unmanned aerial vehicle to be combined with the second cabin carried at a second position of a lifting platform comprises:

controlling the unmanned aerial vehicle to adjust a speed until the unmanned aerial vehicle is directly above the second position and a flight speed of the unmanned aerial vehicle is consistent with a driving speed of the shuttle vehicle again, so that the unmanned aerial vehicle and the shuttle vehicle are kept in a relatively static state again; and controlling the unmanned aerial vehicle to be combined with the second cabin, in response to the unmanned aerial vehicle and the shuttle vehicle being kept in a relatively static state again.

2. The method according to claim 1, further comprising:

providing the unmanned aerial vehicle with energy supply through a backup battery carried in the second cabin.

3. The method according to claim 2, wherein the providing the unmanned aerial vehicle with energy supply through a backup battery carried in the second cabin comprises:

controlling a power supply equipment of the unmanned aerial vehicle to be switched from an original battery to a temporary power supply apparatus, in response to an electric quantity balance of the original battery of the unmanned aerial vehicle being lower than a preset value;

controlling the unmanned aerial vehicle to open a battery compartment and release the original battery into the second cabin, in response to the power supply equipment being switched from the original battery to the temporary power supply apparatus;

controlling the unmanned aerial vehicle to acquire the backup battery into the battery compartment, in response to the original battery being released into the second cabin; and controlling the power supply equipment of the unmanned aerial vehicle to be switched from the temporary power supply apparatus to the backup battery, in response to the backup battery being acquired into the battery compartment.

4. An electronic device, comprising:

one or more processors; and a memory configured to store one or more programs, wherein the one or more programs, when executed by the one or more processors, allow the one or more processors to implement the method according to claim 1.

5. An unmanned aerial vehicle, comprising:

the electronic device according to claim 4;

a fuselage; and a carrying apparatus arranged at a bottom of the fuselage for carrying a separable cabin.

6. A computer-readable storage medium having executable instructions stored thereon, wherein the instructions, when executed by a processor, allow the processor to implement the method according to claim 1.

7. A method for controlling a shuttle vehicle, comprising:

controlling the shuttle vehicle carried with a second cabin to accelerate on a ground orbit in a destination site and controlling a lifting platform of the shuttle vehicle to start to ascend, in response to an unmanned aerial vehicle flying to a second preset airspace near the destination site, wherein the unmanned aerial vehicle is carried with a first cabin being separable from a fuselage, and the unmanned aerial vehicle above the destination site is aligned with the ground orbit, and the unmanned aerial vehicle is maintained to fly at a predetermined flight altitude to continue to fly at a constant speed at an original flight speed, so that the flight altitude of the unmanned aerial vehicle is maintained at the predetermined flight altitude unchanged throughout a whole process from unloading the first cabin to mounting the second cabin, and the second cabin is placed at a second position on the lifting platform;

controlling the lifting platform to stop ascending, in response to the lifting platform ascending to a flight altitude of the unmanned aerial vehicle;

controlling the shuttle vehicle to keep a current speed to drive at a constant speed on the ground orbit, in response to a driving speed of the shuttle vehicle reaching a flight speed of the unmanned aerial vehicle and a first position on the lifting platform being directly below the unmanned aerial vehicle, so as to keep the shuttle vehicle and the unmanned aerial vehicle in a relatively static state, and enable the unmanned aerial vehicle to place the separated first cabin on the first position; and controlling the shuttle vehicle to adjust a speed until the second position on the lifting platform is located directly below the unmanned aerial vehicle and the driving speed of the shuttle vehicle reaches the flight speed of the unmanned aerial vehicle again, in response to the first cabin being placed on the first position, so as to keep the shuttle vehicle and the unmanned aerial vehicle in a relatively static state again, and enable the unmanned aerial vehicle to be combined with the second cabin and send the second cabin to a next destination site.

8. The method according to claim 7, wherein the ground orbit is a straight ground orbit.

9. The method according to claim 7, further comprising:

controlling the shuttle vehicle to decelerate on the ground orbit and controlling the lifting platform to start to descend, in response to the second cabin being separated from the lifting platform, so as to transport a passenger and/or a cargo in the first cabin to an exit of the destination site.

10. The method according to claim 7, further comprising:

fixing the first cabin by a safety apparatus arranged at the first position, in response to the first cabin being placed on the first position.

11. The method according to claim 7, further comprising:

releasing a fixing effect of a safety apparatus arranged at the second position on the second cabin, in response to the shuttle vehicle and the unmanned aerial vehicle being in a relatively static state again.

12. An electronic device, comprising:

one or more processors; and a memory configured to store one or more programs, wherein the one or more programs, when executed by the one or more processors, allow the one or more processors to implement the method according to claim 7.

13. A shuttle vehicle, comprising:

the electronic device according to claim 12;

a vehicle body;

a lifting apparatus arranged on a first plane of a top of the vehicle body, and configured to perform an ascending action and a descending action based on a control command of the apparatus; and a lifting platform arranged on a second plane at a top of the lifting apparatus and configured to park a separable cabin carried by the unmanned aerial vehicle, wherein lifting platform comprises at least two berths.

14. The shuttle vehicle according to claim 13, further comprising:

a safety apparatus arranged on the lifting platform, and configured to fix the separable cabin parked on the lifting platform.

15. A computer-readable storage medium having executable instructions stored thereon, wherein the instructions, when executed by a processor, allow the processor to implement the method according to claim 7.

16. A transportation system, comprising:

at least one unmanned aerial vehicle; and at least one shuttle vehicle, the unmanned aerial vehicle comprising:

an unmanned aerial vehicle electronic device;

a fuselage; and a carrying apparatus arranged at a bottom of the fuselage for carrying a separable cabin, the electronic device comprising:

one or more processors; and a memory configured to store one or more programs, wherein the one or more programs, when executed by the one or more processors, allow the one or more processors to implement:

controlling the unmanned aerial vehicle to be aligned with a ground orbit in a destination site and continue to fly at a predetermined flight altitude, in response to the unmanned aerial vehicle flying to a first preset airspace near the destination site;

controlling the unmanned aerial vehicle to be separated from a first cabin carried by the unmanned aerial vehicle and place the separated first cabin at a first position of a lifting platform of a shuttle vehicle driving along the ground orbit and controlling the unmanned aerial vehicle to be combined with a second cabin carried at a second position of the lifting platform, in response to the unmanned aerial vehicle flying to a position directly above the first position and being in a relatively static state with the shuttle vehicle; and controlling the unmanned aerial vehicle carrying the second cabin to fly to a next destination site, in response to a completion of the combination of the unmanned aerial vehicle and the second cabin, wherein the controlling the unmanned aerial vehicle to be aligned with a ground orbit in a destination site and continue to fly at a predetermined flight altitude comprises:

controlling the unmanned aerial vehicle to be aligned with the ground orbit, and controlling the unmanned aerial vehicle to maintain flying at the predetermined flight altitude to continue to fly at a constant speed at an original flight speed, so that the flight altitude of the unmanned aerial vehicle is maintained at the predetermined flight altitude unchanged throughout a whole process from unloading the first cabin to mounting the second cabin, wherein the controlling the unmanned aerial vehicle to be combined with the second cabin carried at a second position of a lifting platform comprises:

controlling the unmanned aerial vehicle to adjust a speed until the unmanned aerial vehicle is directly above the second position and a flight speed of the unmanned aerial vehicle is consistent with a driving speed of the shuttle vehicle again, so that the unmanned aerial vehicle and the shuttle vehicle are kept in a relatively static state again; and controlling the unmanned aerial vehicle to be combined with the second cabin, in response to the unmanned aerial vehicle and the shuttle vehicle being kept in a relatively static state again, the shuttle vehicle comprising:

a shuttle vehicle electronic device;

a vehicle body;

a lifting apparatus arranged on a first plane of a top of the vehicle body, and configured to perform an ascending action and a descending action based on a control command of the apparatus; and a lifting platform arranged on a second plane at a top of the lifting apparatus and configured to park a separable cabin carried by the unmanned aerial vehicle, wherein lifting platform comprises at least two berths, the electronic device comprising:

one or more processors; and a memory configured to store one or more programs, wherein the one or more programs, when executed by the one or more processors, allow the one or more processors to implement:

controlling the shuttle vehicle carried with the second cabin to accelerate on a ground orbit in a destination site and controlling a lifting platform of the shuttle vehicle to start to ascend, in response to an unmanned aerial vehicle flying to a second preset airspace near the destination site, wherein the unmanned aerial vehicle is carried with a first cabin being separable from a fuselage, and the unmanned aerial vehicle above the destination site is aligned with the ground orbit and flies at a predetermined flight altitude to continue to fly at a constant speed at an original flight speed, so that the flight altitude of the unmanned aerial vehicle is maintained at the predetermined flight altitude unchanged throughout a whole process from unloading the first cabin to mounting the second cabin, and the second cabin is placed at a second position on the lifting platform;

controlling the lifting platform to stop ascending, in response to the lifting platform ascending to a flight altitude of the unmanned aerial vehicle;

controlling the shuttle vehicle to keep a current speed to drive at a constant speed on the ground orbit, in response to a driving speed of the shuttle vehicle reaching a flight speed of the unmanned arial vehicle and a first position on the lifting platform being directly below the unmanned aerial vehicle, so as to keep the shuttle vehicle and the unmanned aerial vehicle in a relatively static state, and enable the unmanned aerial vehicle to place the separated first cabin on the first position; and controlling the shuttle vehicle to adjust a speed until the second position on the lifting platform is located directly below the unmanned aerial vehicle and the driving speed of the shuttle vehicle reaches the flight speed of the unmanned aerial vehicle again, in response to the first cabin being placed on the first position, so as to keep the shuttle vehicle and the unmanned aerial vehicle in a relatively static state again, and enable the unmanned aerial vehicle to be combined with the second cabin and send the second cabin to a next destination site.

* * * * *